United States Patent
Wakabayashi

(10) Patent No.: US 6,795,082 B2
(45) Date of Patent: Sep. 21, 2004

(54) IMAGE GENERATION SYSTEM, PROGRAM AND IMAGE GENERATION METHOD

(75) Inventor: Akiko Wakabayashi, Yokohama (JP)

(73) Assignee: Namco Ltd., Tokyo (JP)

(*) Notice: Subject to any disclaimer, the term of this patent is extended or adjusted under 35 U.S.C. 154(b) by 192 days.

(21) Appl. No.: 10/029,241

(22) Filed: Dec. 28, 2001

(65) Prior Publication Data

US 2002/0101770 A1 Aug. 1, 2002

(30) Foreign Application Priority Data

Jan. 10, 2001 (JP) ........................................ 2001-002403

(51) Int. Cl.$^7$ ................................................ G09G 5/00
(52) U.S. Cl. ...................................................... 345/582
(58) Field of Search ................................. 345/555, 582, 345/583–588, FOR 130; 348/14.13, 439.1, 568, FOR 159; 382/166, 232, 233, 235, 243, 244

(56) References Cited

U.S. PATENT DOCUMENTS 5,592,599 A * 1/1997 Lindholm .................... 345/427
5,974,186 A * 10/1999 Smith et al. ................. 382/240

* cited by examiner

Primary Examiner—Matthew C. Bella
Assistant Examiner—G. F. Cunningham
(74) Attorney, Agent, or Firm—Oliff & Berridge, PLC

(57) ABSTRACT

Movie texture mapping is performed in which compressed textures CTEX-1 to CTEX-N are expanded to form expanded texture ETEX-1 to ETEX-N which are in turn mapped onto an object in a sequential manner. Movie texture mapping for the random replay is performed in which textures are mapped on the object OB1 in the order starting from ETEX-K, and also on the object OB2 in the order starting from ETEX-L. Movie texture mapping for the frame-decimation replay is performed in which mapping of the expanded texture ETEX-I is followed by mapping of the expanded texture ETEX (I+J) (when J≧2). The compressed movie texture data contains data used to designate storage locations of the compressed textures CTEX-1 to CTEX-N. The objects OB1 and OB2 can be arranged to overlap each other to represent an image having an increased area such as a flame image. Replay starting frames K and L may be randomly set, and the number of texture frames to be decimated (J−1) may be determined according to event occurrence or time passage.

18 Claims, 19 Drawing Sheets

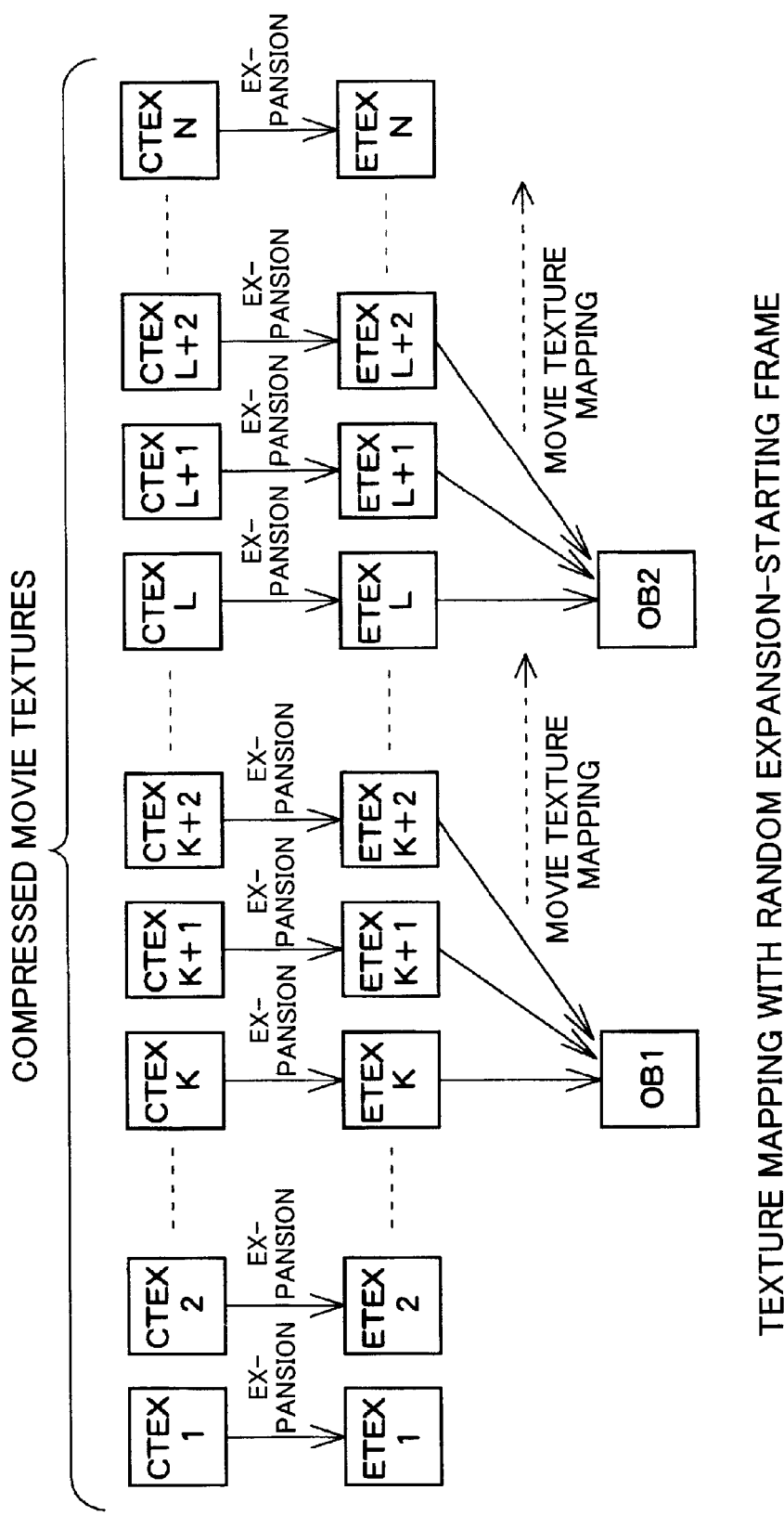

IMAGE GENERATION SYSTEM, PROGRAM AND IMAGE GENERATION METHOD

BACKGROUND OF THE INVENTION

The present invention relates to an image generation system, program and image generation method.

There is known an image generation system (game system) which can generate an image as viewed from a virtual camera (a given viewpoint) within an object space that is a virtual three-dimensional space. Such a game system is highly popular from the fact that it can provide a so-called virtual reality. If the image generation system is for enjoying a role-playing game (RPG), a player can enjoy the game by controlling a character (or object) allocated to the player to move it on a map within the object space such that the player will fight against an enemy character, dialogue with any other character or visit various cities and towns.

In such a type of image generation system, a so-called movie (or moving image) is often replayed (reproduced) to increase a player's desire or emotion in a game opening, intermission or ending. The movie data has been MPEG-compressed and stored in an information storage medium and is replayed by expanding (or decoding) it through a hardware expander (or decoding unit or data expansion processor) which is included in the image generation system.

This movie enables more realistic representation in comparison with a picture generated by moving a three-dimensional object formed of polygons (or primitives) in real time, since the movie can be high quality computer generated (CG) pictures produced by CG tools spending a long time, or actual pictures photographed by a camera in the real world.

However, such a movie has only been considered to be used in this game opening or the like. Thus, the hardware expander in the image generation system could only handle the compressed data of the movie as a series of data streams. In other words, the compressed movie data could only be expanded and replayed in the order starting from the first frame and ending the last frame.

Also in the history, MPEG method or the like has only been considered to handle the compressed data as a series of streams and to expand and replay it.

This type of the movie is thus suitable for representation in the game opening or the like, but it is not suitable for real-time generation of a game picture which is always variable depending on the player's operation or the like, since the movie can be replayed only in the predetermined order starting from the first frame, but not from an arbitrary frame.

BRIEF SUMMARY OF THE INVENTION

A first aspect of the present invention relates to an image generation system comprising:

an expansion section which expands a series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein the texture mapping section maps the series of first to N-th expanded textures onto a first object in the order starting from the K-th expanded texture obtained by expanding the K-th compressed texture, and also onto a second object in the order starting from the L-th expanded texture obtained by expanding the L-th compressed texture.

A second aspect of the present invention relates to an image generation system comprising:

an expansion section which expands a series of first to N-th compressed textures included in compressed movie textures;

a texture mapping section which maps a series of first to N-th expanded textures sequentially on to an object, the series of first to N-th expanded textures being obtained by expanding the series of first to N-th compressed textures, wherein the texture mapping section maps the series of first to N-th expanded textures sequentially on to an object while performing texture frame decimation in which mapping of the I-th expanded texture is followed by mapping of the (I+J)-th expanded texture (when $J \geq 2$).

A third aspect of the present invention relates to an image generation system comprising:

a storage section which stores compressed movie texture data including a series of first to N-th compressed textures;

an expansion section which expands the series of first to N-th compressed textures included in compressed movie textures; and a texture mapping section which maps a series of first to N-th expanded textures sequentially on to an object, the series of first to N-th expanded textures being obtained by expanding the series of first to N-th compressed textures, wherein:

the compressed movie texture data stored in the storage section contains designation data used to designate storage locations of the first to N-th compressed textures; and the texture mapping section maps an expanded texture obtained by expanding a compressed texture designated by the designation data onto an object.

A fourth aspect of the present invention relates to an image generation system comprising:

a storage section which stores compressed movie data including a series of first to N-th compressed frame images; and an expansion section which expands the series of first to N-th compressed frame images included in compressed movies, wherein:

the compressed movie data stored in the storage section contains designation data used to designate storage locations of the first to N-th compressed frame images; and a frame image obtained by expanding a compressed frame image designated by the designation data is replayed.

BRIEF DESCRIPTION OF THE SEVERAL VIEWS OF THE DRAWING

FIG. 3 illustrates a movie texture mapping for random replay.

DETAILED DESCRIPTION OF THE EMBODIMENTS

Figure 1:
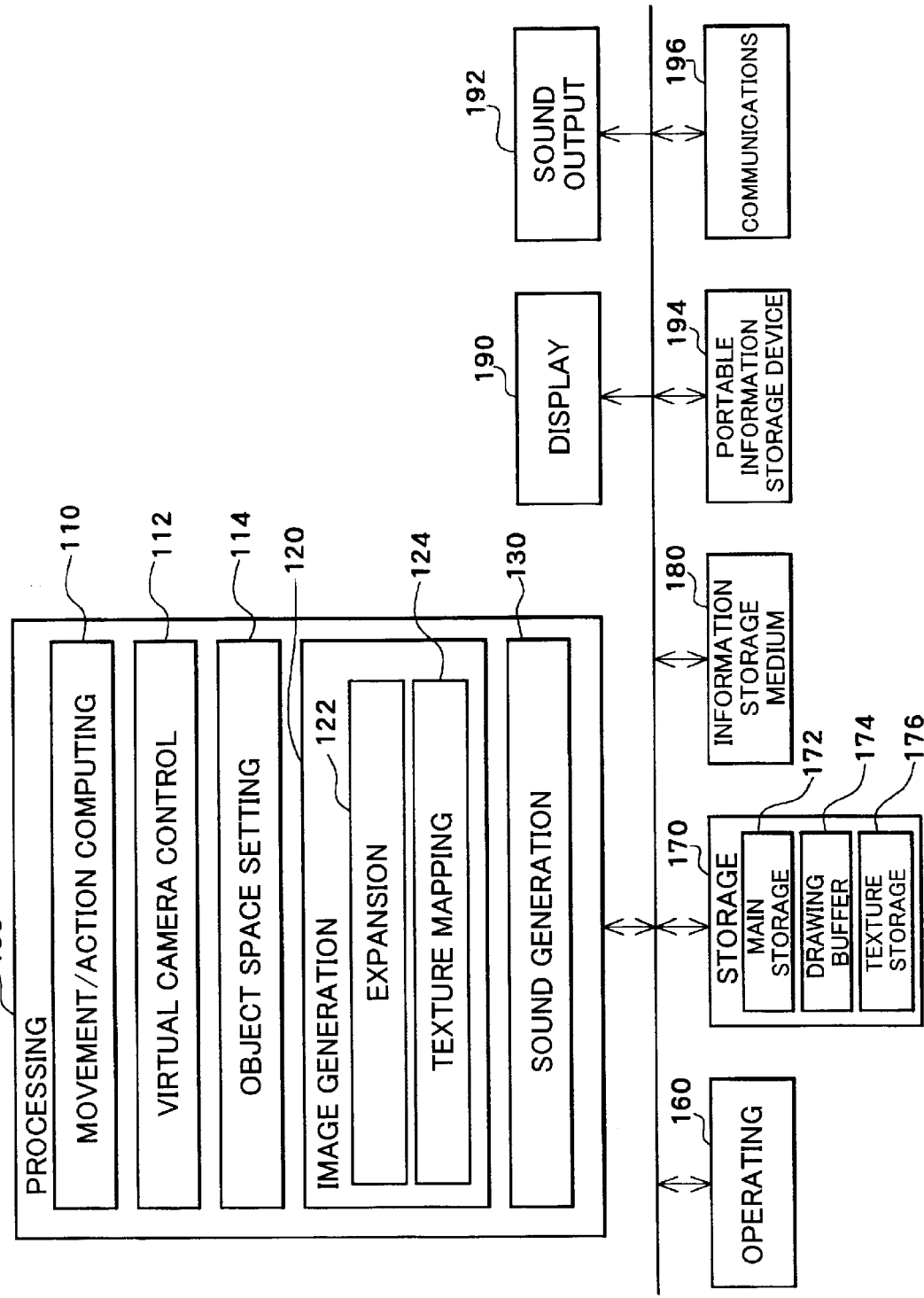
FIG. 1 is a functional block diagram of an image generation system according to one embodiment of the present invention.

An image generation system, a program and an image generation method according to embodiments of the present invention can implement various image representations by movies with reduced amount of data.

The embodiments will now be described below.

Note that the embodiments described below do not in any way limit the scope of the invention defined by the claims laid out herein. Similarly, all the elements of the embodiments described below should not be taken as essential requirements of the present invention.

According to one embodiment of the present invention, there is provided an image generation system comprising: an expansion section which expands a series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein the texture mapping section maps the series of first to N-th expanded textures onto a first object in the order starting from the K-th expanded texture obtained by expanding the K-th compressed texture, and also onto a second object in the order starting from the L-th expanded texture obtained by expanding the L-th compressed texture. A program according to one aspect of the present invention makes a computer function as the above-described sections.

According to one embodiment of the present invention, there is provided a computer-readable information storage medium storing (or recording) a program for causing a computer to function as the above-described sections.

According to the above embodiments, movie texture mapping is performed by expanding a series of first to N-th compressed textures and mapping a series of first to N-th expanded textures sequentially (cyclically) onto an object.

Moreover, the expanded textures are mapped onto the first object in the order starting from K-th expanded texture obtained by expanding K-th compressed texture and also onto the second object in the order starting from L-th expanded texture obtained by expanding L-th compressed texture. In other words, the replay (reproduction) starting frames (or expansion starting frames) of the textures are different for each object. Thus, although common compressed movie textures are used, images of objects are viewed in different ways, enabling various image representations with reduced amount of data.

According to one embodiment of the present invention, there is provided an image generation system comprising: an expansion section which expands a series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein the texture mapping section maps the series of first to N-th expanded textures sequentially onto an object while performing texture frame decimation in which mapping of the I-th expanded texture is followed by mapping of the (I+J)-th expanded texture (when J≧2). A program according to one embodiment of the present invention causes a computer to function as the above-described sections. According to one embodiment of the present invention, there is provided a computer-readable information storage medium storing (or recording) a program for causing a computer to function as the above-described sections.

According to the above embodiments, the movie texture mapping for the frame-decimation (frame-skip) replay is carried out in which the I-th expanded texture obtained by expanding the I-th compressed texture is mapped on an object and then the (I+J)-th (when J≧2) expanded texture obtained by expanding the (I+J)-th compressed texture is mapped. The number of texture frames to be decimated (skipped, thinned out) can be set at an arbitrary number. Thus, although common compressed movie textures are used, the replay speed of the movie textures mapped on the objects can be varied, thereby enabling various image representations with reduced amount of data.

According to one embodiment of the present invention, there is provided an image generation system comprising: a storage section which stores compressed movie texture data including a series of first to N-th compressed textures; an expansion section which expands the series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein: the compressed movie texture data stored in the storage section contains designation data used to designate storage locations of the first to N-th compressed textures; and the texture mapping section maps an expanded texture obtained by expanding a compressed texture designated by the designation data onto an object. A program according to one embodiment of the present invention causes a computer to function as the above-described sections. According to one embodiment of the present invention, there is provided a computer-readable information storage medium storing (or recording) a program for causing a computer to function as the above-described sections.

According to these embodiments, the compressed movie texture data contains designation data used to designate storage locations of the first to N-th compressed textures. By using this designation data, thus, the expansion and replay of the compressed texture at an arbitrary frame can be carried out, thereby enabling different image representations with reduced amount of data.

In the image generation system, program and image generation method according to the above embodiments of the present invention, the first and second objects may be arranged to overlap each other.

This configuration enables the representation of an image having an increased area by combining the areas of the first and second objects while using the common movie texture data.

In the image generation system, program and image generation method according to the above embodiments of the present invention, the first and second objects may be arranged such that a non-transparent part of a texture to be mapped on the first object overlaps a non-transparent part of another texture to be mapped on the second object, in all frames to be replayed.

This configuration ensures that no gap is created between the non-transparent parts of the first and second object textures. Thus, a display object obtained by combining the first and second objects and having a large area can be represented.

In the image generation system, program and image generation method according to the above embodiments of the present invention, values of the number K and number L may be randomly determined.

This enables different views of images according to the values of K and L, improving the variety of the image representation.

In the image generation system, program and image generation method according to the above embodiments of the present invention, a value of the number J may be determined according to at least one of an occurrence of a given event and an elapse of given time.

This enables different views of images according to the event occurrence or time passage.

According to one embodiment of the present invention, there is provided an image generation system comprising: a storage section which stores compressed movie data including a series of first to N-th compressed frame images; and an expansion section which expands the series of first to N-th compressed frame images included in compressed movies, wherein: the compressed movie data stored in the storage section contains designation data used to designate storage locations of the first to N-th compressed frame images; and a frame image obtained by expanding a compressed frame image designated by the designation data is replayed. A program according to one embodiment of the present invention causes a computer to function as the above-described sections. According to one embodiment of the present invention, there is provided a computer-readable information storage medium storing (or recording) a program for causing a computer to function as the above-described sections.

According to these embodiments, the compressed movie data contains designation data for designating the storage locations of the first to N-th compressed frame images. By using this designation data, thus, the compressed frame image at an arbitrary frame can be expanded and replayed, thereby enabling different images to be represented with reduced amount of data.

One embodiment of the present invention will now be described below in detail, with respect to the accompanying drawings.

1. Configuration

FIG. 1 shows a block diagram of a game system (image generation system) according to this embodiment. In this figure, this embodiment may comprise at least a processing section 100 (or a processing section 100 with a storage unit 170). Each of the other blocks may take any suitable form.

A operating section 160 is used to input operational data from the player and the function thereof may be implemented through any suitable hardware means such as a lever, a button, a housing or the like.

The storage unit 170 provides a working area for the processing section 100, communications section 196 and others. The function thereof may be implemented by any suitable hardware means such as RAM or the like.

An information storage medium (which may be a computer-usable storage medium) 180 stores information including programs, data and others. The function thereof may be implemented through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the program (or data) that has been stored in this information storage medium 180. In other words, the information storage medium 180 stores a program for causing a computer to implement the means of the present invention (or this embodiment) which are particularly represented by the blocks included in the processing section 100. Such a program may include one or more modules (including object-oriented objects).

Part or the whole of the information stored in the information storage medium 180 will be transferred to the storage unit 170 when the system is initially powered on. The information stored in the information storage medium 180 may contain at least one of a program for processing the present invention, image data, sound data, shape data of objects to be displayed, table data, list data, information for instructing the processings in the present invention, information for performing the processings according to these instructions and so on.

A display unit 190 is to output an image generated according to this embodiment and the function thereof can be implemented by any suitable hardware means such as CRT, LCD or HMD (Head-Mount Display).

A sound output section 192 is to output a sound generated according to this embodiment and the function thereof can be implemented by any suitable hardware means such as speaker.

A portable information storage device 194 is to store the player's personal data and save data and may be take any suitable form such as memory card, portable game machine and so on.

A communications section 196 performs various controls for communications between the game system and any external device (e.g., host machine or other image generation system). The function thereof may be implemented through any suitable hardware means such as various types of processors or ASIS for communications or according to any suitable program.

A program (or data) for implementing (or executing) the means of the embodiment of the present invention maybe delivered from an information storage medium of a host machine (or server) to the information storage medium 180 through a network and the communications section 196. The use of such an information storage medium in the hose machine (or server) falls within the scope of the invention.

The processing section (processor) 100 is to perform various processings such as game processing, image generating or sound generating, based on the control data or program from the operating section 160. In this case, the processing section 100 performs various processings using a main storage section 172 of the storage unit 170 as the working area.

The processing section 100 may perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space, hit checking, computation of the game results (or scores), processing for causing a plurality of players to play in a common game space and various other game processings including game-over.

The processing section 100 comprises a movement/action computing section 110, a virtual camera control section 112, an object space setting section 114, an image generation section 120 and a sound generation section 130. However, the processing section 100 is not necessarily required to include all of these functional blocks.

The movement/action computing section 110 computes the movement information (position and rotational angle) for an object such as character or motorcar (movable object) and the action information (positions and rotation angles of the object parts). For example, the movement/action computing section 110 may cause the object to move or act (motion or animation) based on the operational data inputted by a player through the operating section 160.

More particularly, the movement/action computing section 110 may change the position or rotation angle of the object, for example, for each frame (e.g., 1/60 seconds or 1/30 seconds). For example, it is assumed that the position and rotation angle of the object as a frame (k−1) are respectively $P_{k-1}$ and $\theta_{k-1}$ and that the positional variation (velocity) and rotational variation (rotational velocity) of the object for one frame are respectively $\Delta P$ and $\Delta \theta$. The position $P_k$ and rotation angle $\theta_k$ of the object for a frame k may be determined, for example, by the following formulas (1) and (2):

$$P_k = P_{k-1} + \Delta P \quad (1)$$

$$\theta_k = \theta_{k-1} + \Delta \theta \quad (2)$$

The virtual camera control section 112 is to control a virtual camera for generating an image as viewed from a given (or an arbitrary) viewpoint within the object space. In other words, the virtual camera control section 112 may perform a process of controlling the position (X, Y, Z) of the virtual camera and the rotation (about X-, Y- and Z-axes) of the same (or a process of controlling the viewpoint position and the line-of-sight direction).

If it is now assumed that the backside of a moving object is shot by the virtual camera, it is desirable to control the position or rotation of the virtual camera (or the direction of the virtual camera) such that the virtual camera will follow the positional or rotational variation of the moving object. In this case, the virtual camera will be controlled based on the information from the movement/action computing section 110 relating to the position, direction or velocity in the moving object. Alternatively, the virtual camera may be rotated through a predetermined angle range while moving it along a predetermined path of movement. In such a case, the virtual camera will be controlled based on a virtual camera data for specifying the position (or movement path) and rotation angle of the virtual camera.

The object space setting section 114 is to set various objects including maps (or objects configured by primitives such as polygons, free-form surfaces or sub-division surfaces) within the object space. More particularly, the object space setting section 114 determines the position and rotation angle (direction) of each object in the world coordinate system and then arranges the object at that position (X, Y, Z) with that rotation angle (about X-, Y- and Z-axes).

The image generation section 120 is to process and generate a game image based on various processing results in the processing section 100, the game image being then outputted toward the display unit 190. For example, on generation of a so-called three-dimensional game image, a geometry processing such as coordinate transformation, clipping, perspective transformation or light source computation is first carried out with the results being then used to create a drawing data such as positional coordinates given to a component point (vertex) of each primitive, texture coordinates, color (brightness) data, normal vector or α-value. Based on this drawing data (or primitive data), the image of the geometry-processed object (one or more primitives) will be drawn in a drawing buffer 174 (e.g., a buffer which can store image information by pixel, such as a frame buffer or a work buffer). Thus, the image will be generated as viewed from the virtual camera (or a given viewpoint) within the object space.

The sound generation section 130 is to process and generate a game sound such as BGM, effect sound or voice based on the various processing results in the processing section 100, the game sound being then outputted toward the sound output section 192.

The image generation section 120 comprises an expansion section 122 and a texture mapping section 124.

The expansion section 122 (or decoding portion) is to expand (or decode) a compressed data which has been compressed through JPEG or MPEG compression method. More particularly, a series of I pictures compressed through MPEG are expanded.

For example, the data compression can be implemented through the following process.

The data is first divided into a plurality of macro-blocks. Each of the divided blocks is then subjected to DCT (discrete cosine transformation: In a broad sense, it is an orthogonal transformation including Hadamard transformation, eigenvalue transformation and the like). Thus, the data is frequency (or spatial-frequency)-decomposed. Each of the DCT coefficients obtained from DCT is quantized. Huffman coding (or entropy coding or variable-length coding) is then carried out to provide the compressed data.

On the other hand, the data expansion can be implemented through the following process.

The compressed data is first read in from the information storage medium 180. Alternatively, the compressed data is externally read in through a network (or transmission line or communication line) and the communications section 196. The expansion section 122 performs Huffman decoding (or entropy decoding or variable-length decoding) to the read compressed data. The expansion section 122 then performs the inverse quantization to the data after Huffman decoded. The inverse DCT is finally made to provide the expanded data.

In the MPEG (MPEG2, MPEG4 or the like), the predictive coding, predictive decoding (or motion compensation interframe prediction) may be carried out.

The texture mapping section 124 is to map a texture stored in a texture storage section 176 on an object.

In this embodiment, the texture storage section 176 is to store the data of compressed movie textures (which is, in a broad sense, a compressed movie: they are identical in the following description) including a series of first to N-th compressed textures (which is, in a broad sense, first to N-th compressed frame images: they are identical in the following description).

The expansion section 122 performs the expanding process based on the data of compressed movie textures and the texture mapping section 124 performs the mapping process in which a series of first to N-th expanded textures (which are, in a broad sense, first to N-th expanded frame images: they are is identical in the following description) obtained by expanding the series of first to N-th compressed textures are sequentially mapped on the object.

At this time, in this embodiment, the compressed movie texture data stored in the texture storage section 176 contains designation data used to designate the storage locations (addresses or the like) of the first to N-th compressed textures. By using such designation data, there will be implemented the frame-decimation replay of the compressed textures or the random replay in which the starting frame for the replay of compressed textures is randomly set.

More particularly, the random replay type movie texture mapping is performed relative to the first object such that it will cyclically be mapped by K-th expanded texture, (K+1)-th texture, (K+2)-th texture, . . . N-th expanded texture, first expanded texture, second expanded texture, . . . (K−1)-th expanded texture. On the other hand, the second object will cyclically be mapped by L-th expanded texture, (L+1)-th texture, (L+2)-th texture, . . . N-th expanded texture, first expanded texture, second expanded texture, . . . (L−1)-th expanded texture.

Alternatively, the movie texture mapping for the frame-decimation replay may be performed in which the first to N-th expanded textures are cyclically mapped on objects such that mapping of the I-th expanded texture is followed by mapping of the (I+J)-th (when J≧2).

There may be three or more of objects having different starting frames for expanded textures to be mapped. The random replay may be performed while at the same time the frame-decimation replay is made.

The image generation system of the present invention may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals (game machines or portable telephones) interconnected through a network (transmission lien or communication line) may be used in the present invention.

2. Features of this Embodiment

The features of this embodiment will be described with reference to the drawings. Although the representation of flame or water to which the present invention is applied has been described as examples, the present invention may similarly be applied to any image representation other than the representation of flame or water, such as grassland, tree, smoke or cloud.

2.1 Movie Texture Mapping for Random Replay

This embodiment takes the movie texture mapping process to represent realistic waves or water surface.

Figure 2:
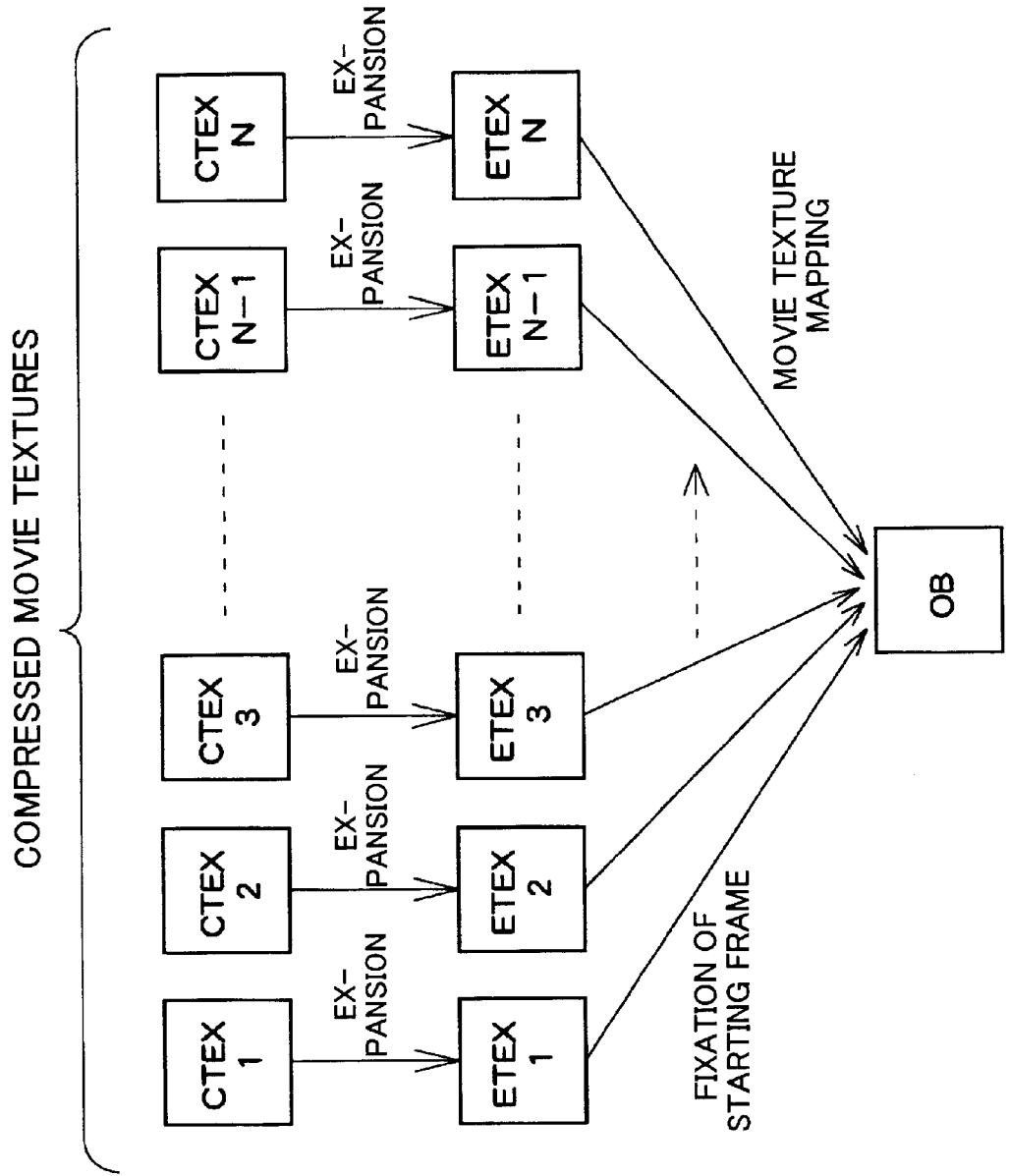
FIG. 2 illustrates a movie texture mapping.

As shown in FIG. 2, the movie texture mapping provides a series of compressed textures (or compressed frame images) CTEX-1 to CTEX-N for representing pictures of flame or water surface. These compressed textures CTEX-1 to CTEX-N are then expanded to form a series of expanded textures (expanded frame images) ETEX-1 to ETEX-N which are in turn mapped on an object OB of flame or water surface sequentially or cyclically.

In this movie texture mapping process, textures mapped on objects are changed sequentially with time passage (or frame updating). Thus, it can generate more various images than the static texture mapping.

The movie texture mapping enables more realistic representation since it can use high-quality CG pictures produced by CG tools spending a long time, or actual pictures photographed by a camera in the real world, as textures.

Furthermore, since the compressed textures CTEX-1 to CTEX-N are stored in the information storage medium while being compressed or transferred to any external site through a network, the capacity of the information storage medium or the communication capacity of the network can be saved.

However, the movie texture mapping process of FIG. 2 can only handle the compressed textures CTEX-1 to CTEX-N as a series of data (streams). The compressed textures will always be expanded in the order starting from CTEX-1 so that the expanded textures will be mapped on the object OB in the order starting from ETEX-1. In other words, there play starting frame will always be fixed to the first frame CTEX-1 (ETEX-1). This raises a problem in that the resulting image will be very monotonous.

To overcome such a problem, this embodiment takes the movie texture mapping process in which replay start frame can be set randomly (or arbitrarily).

More particularly, as shown in FIG. 3, an object OB1 is subjected to the movie texture mapping after the frame K has been set as the replay starting frame while another object OB2 is subjected to the movie texture mapping after the frame L different from the frame K has been set as the replay starting frame.

For example, the movie texture mapping is carried out to the object OB1 in the order starting from an expanded texture ETEX-K obtained by expanding a compressed texture CTEX-K at the frame K. Namely, textures ETEX-K, ETEX-(K+1), ETEX-(K+2), . . . ETEX-(N−1), ETEX-N, ETEX-1, ETEX-2, . . . ETEX-(K−2), ETEX-(K−1), ETEX-K and so on will cyclically be mapped on the object OB1.

On the other hand, the movie texture mapping is carried out to the object OB2 in the order starting from an expanded texture ETEX-L obtained by expanding a compressed texture CTEX-L at the frame L. Namely, textures ETEX-L, ETEX-(L+1), ETEX-(L+2), . . . ETEX-(N−1), ETEX-N, ETEX-1, ETEX-2, . . . ETEX-(L−2), ETEX-(L−1), ETEX-L and so on will cyclically be mapped on the object OB2.

In such a manner, the images of the objects OB1 and OB2 can be viewed in different ways while using the same compressed textures CTEX-1 to CTEX-N. Thus, the degree of variety in the image representation can be increased with reduced amount of data.

Figure 4A:
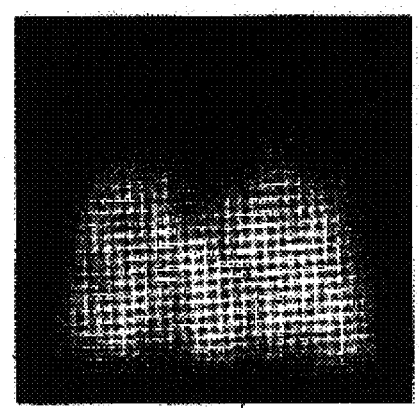
FIGS. 4A, 4B and 4C illustrate movie textures representing flames.
Figure 4B:
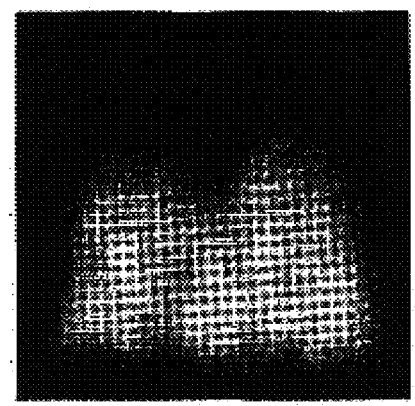
Figure 4C:
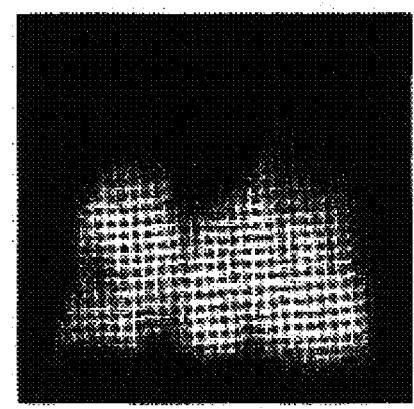

FIGS. 4A, 4B and 4C exemplify movie texture images for the respective frames used in this embodiment. These movie textures are used to represent flames. When the movie textures are continuously replayed, a manner in which the flames flare can realistically be represented.

Figure 5A:
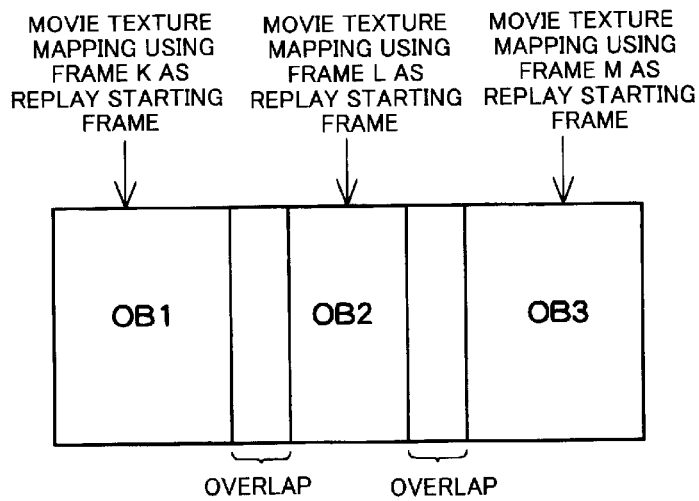
FIGS. 5A, 5B and 5C illustrate layouts of objects on which movie textures are mapped for random replay.

In this embodiment, as shown in FIG. 5A, three objects OB1, OB2 and OB3 (which may be at least two objects) on which the movie textures of FIGS. 4A, 4B and 4C are to be mapped are arranged to overlap. Different replay starting frames are used when they are to be mapped on the objects OB1, OB2 and OB3.

In other words, the movie texture mapping is performed to the object OB1 using the frame K as the replay starting frame; to the object OB2 adjacent to the object OB1 using the frame L as the replay starting frame; and to the object OB3 adjacent to the object OB2 using the frame M as the replay starting frame.

In such a manner, a broad flame (which is increased to three times the flames of FIGS. 4A, B and C) can be represented, thereby increasing the degree of variety in the generated image. In addition, various realistic images can be generated while saving the memory capacity for the textures, since the compressed movie textures are shared by the objects OB1, OB2 and OB3.

Figure 5B:
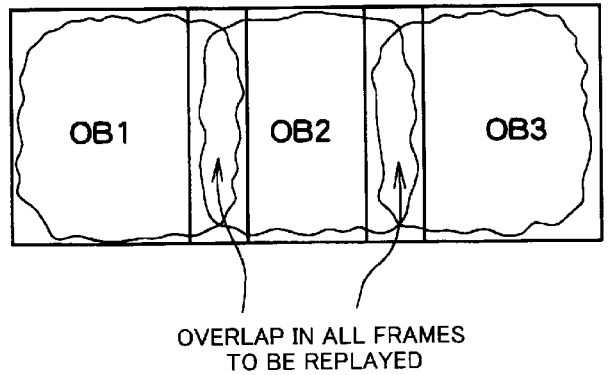

As shown in FIG. 5B, furthermore, this embodiment places the objects OB1 and OB2 such that the non-transparent (semi-transparent or opaque) parts of the textures mapped on the object OB1 overlap the non-transparent parts of the textures mapped on the second object OB2 through all the replay frames (first to N-th frames). Similarly, the objects OB2 and OB3 are placed such that the non-transparent (semi-transparent or opaque) parts of the textures mapped on the object OB2 overlap the non-transparent parts of the textures mapped on the second object OB3 through all the replay frames (first to N-th frames).

In such a manner, it can be ensured that no gap will be created between the flames (or non-transparent parts) drawn on the objects OB1 and OB2 and between the flames drawn on the objects OB2 and OB3 if the movie textures are sequentially replayed through the movie texture mapping. Therefore, an illusion as if the combination of these smaller flames is one larger flame can be provided to a player. This means that the larger flame occupying an increased area can be represented with reduced amount of data.

Figure 5C:
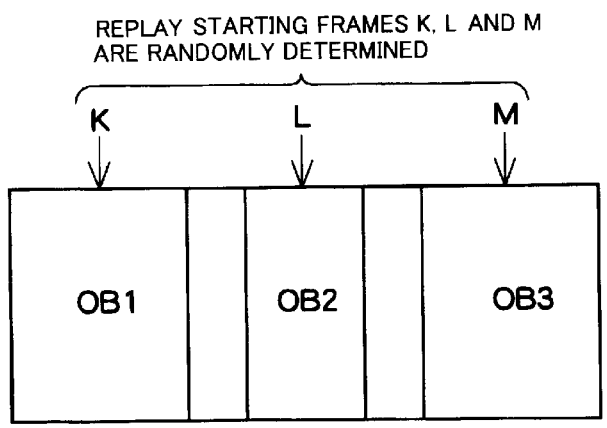

Furthermore, this embodiment randomly (arbitrarily) sets the replay starting frames K, L and M for the objects OB1, OB2 and OB3, as shown in FIG. 5C.

In this way, the flame can be represented and viewed in different ways according to the setting of the replay starting frames K, L and M, thereby further increasing the degree of variety in the image representation. The way in which the flame image created when the replay starting frames K, L and M are respectively set to be equal to 10, 18 and 30 is wholly different from the way in which the flame image created when the replay starting frames K, L and M are respectively set to be equal to 5, 20 and 35. Therefore, almost innumerable types of flames can be represented according to the setting of K, L and M.

Further variable types of flames can be represented if the replay starting frames K, L and M are set according t at least one of the event occurrence and time passage.

Figure 6A:
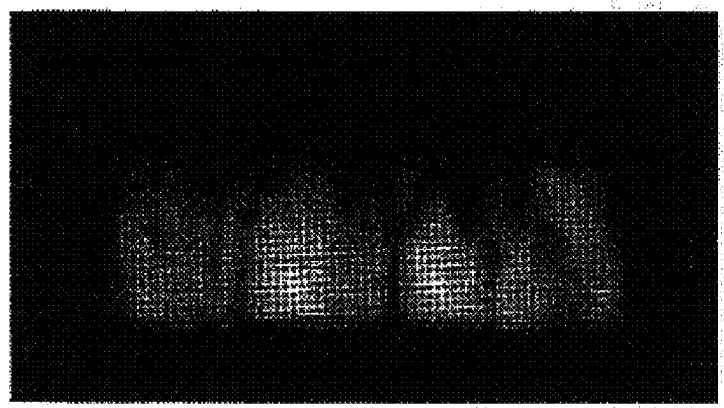
FIGS. 6A, 6B and 6C show examples of flames generated according to one embodiment of the present invention.
Figure 6B:
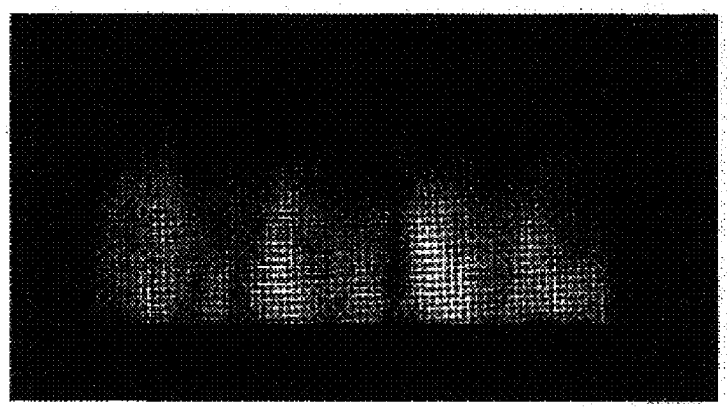
Figure 6C:
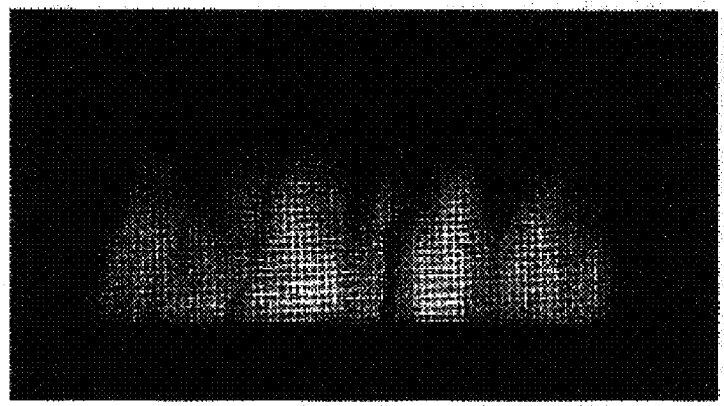

FIGS. 6A, 6B and 6C exemplify flame images generated by mapping the movie textures of FIGS. 4A, 4B and 4C on a plurality (at least two) of objects with different replay starting frames.

As described, this embodiment can represent a broader flame realistically and implement such an image represen-tation that would not be attained by the prior art merely by providing smaller flame textures as shown in FIGS. 4A, 4B and 4C.

The technique of this embodiment may be applied to any other image representation for grasslands, trees, streams, smokes, clouds or the like, in addition to the image representation of flames as shown in FIGS. 6A, 6B and 6C.

2.2 Frame-decimation Replay of Textures (Change of Replay Velocity)

The present invention can implement the movie texture mapping for the frame-decimation replay by a technique of replaying an arbitrary frame in the movie textures.

More particularly, the expanded textures ETEX-1 to ETEX-N are sequentially mapped on the object OB while performing frame decimation such that mapping of an expanded texture ETEX-I obtained by expanding a compressed texture CTEX-I on the object OB is followed by mapping of an expanded texture ETEX-(I+J) obtained by expanding an compressed texture CTEX-(I+J) (when $J \geq 2$) on the object OB.

For example, the expanded textures ETEX-1 to ETEX-N may cyclically be mapped on the object OB while performing frame decimation such that expanded textures ETEX-I, ETEX-(I+2), ETEX-(I+4), ETEX-(I+6), . . . ETEX-N, ETEX-2, . . . ETEX-(I−2), ETEX-I . . . are mapped.

In such a manner, the velocity of movie texture replay can variably be changed by changing (J−1) corresponding to the number of texture frames to be decimated.

For example, if J=2, the movie textures can be replayed at a velocity equal to two times that of the replay in which the movie texture mapping for frame-decimation replay is not performed. If J=3, the movie textures can be replayed at trebled velocity. As a result, the object OB will be viewed in different manners depending on the setting of J while using the common compressed movie textures, thereby increasing the degree of variety in the image representation with reduced amount of data.

Figure 8A:
FIGS. 8A, 8B and 8C show examples of movie textures representing water surfaces (or waves).
Figure 8B:
Figure 8C:

FIGS. 8A, 8B and 8C exemplify movie texture images for each frame used in this embodiment. These movie textures represent water surfaces (waves). When these movie textures are continuously replayed, the flow of water on the surface can realistically be represented.

Figure 9A:
FIGS. 9A and 9B show examples of water surfaces generated according to one embodiment of the present invention.

This embodiment successfully generate such a realistic water-surface (or wave) image as shown in FIG. 9A by mapping such movie textures as shown in FIGS. 8A, 8B and 8C on a water-surface (or wave) object.

Figure 9B:
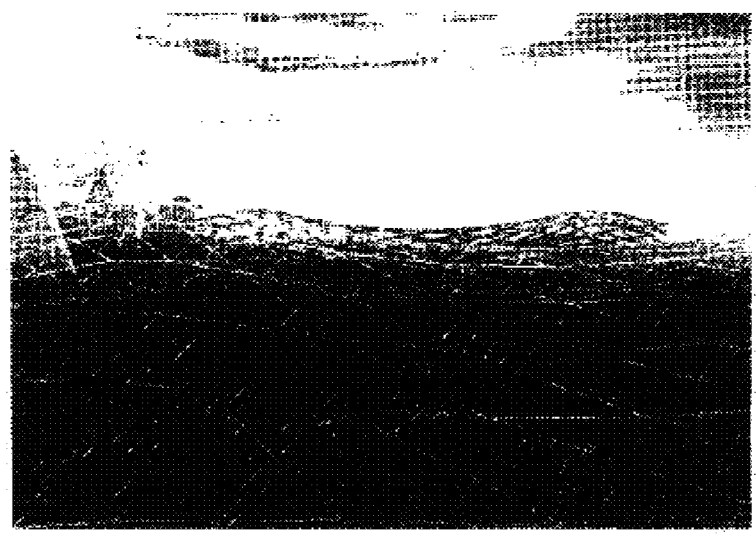

More particularly, as shown in FIG. 9B, the water-surface object is configured by an aggregate of polygons. Each of the polygons (which are, in a broad sense, primitives) is mapped by such movie textures as shown in FIGS. 8A, 8B and 8C to represent a water surface. The image at each of the upward, downward, leftward and rightward sides in each of the movie textures shown in FIGS. 8A, 8B and 8C is formed to be such a picture that will not inconsistent with a picture of any other polygon (or movie texture) placed adjacent to that polygon.

Furthermore, this embodiment implements a more realistic image representation by setting J (or the number of texture frames to be decimated) according to at least one of a given event occurrence and given time passage, thereby implementing a more realistic image representation.

Figure 10A:
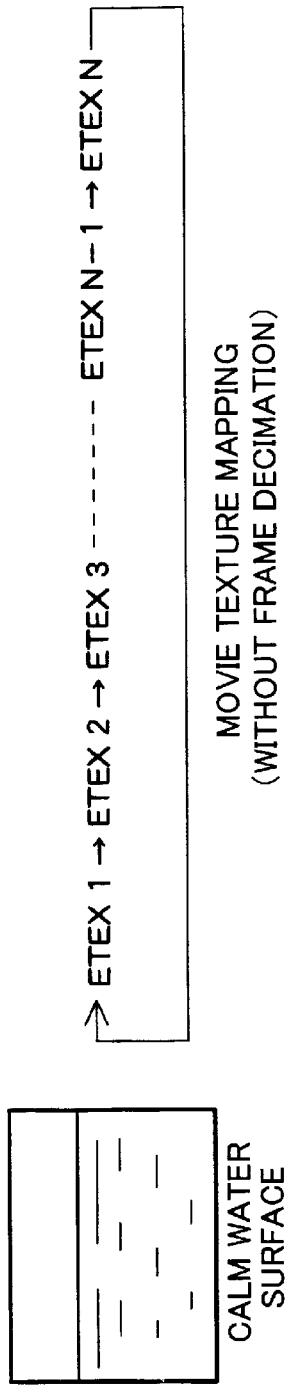
FIGS. 10A, 10B and 10C illustrate a technique of changing the number of texture frames to be decimated according to the event occurrence or time passage.

As shown in FIG. 10A, for example, the movie texture mapping may be carried out without frame decimation in which number J is set at 1 in a game stage and textures as indicated by ETEX-1, ETEX-2, ETEX-3, . . . ETEX-(N−1), ETEX-N, ETEX-1 and so on are mapped on the object. This can represent a water surface on which the water gently flows.

Figure 10B:
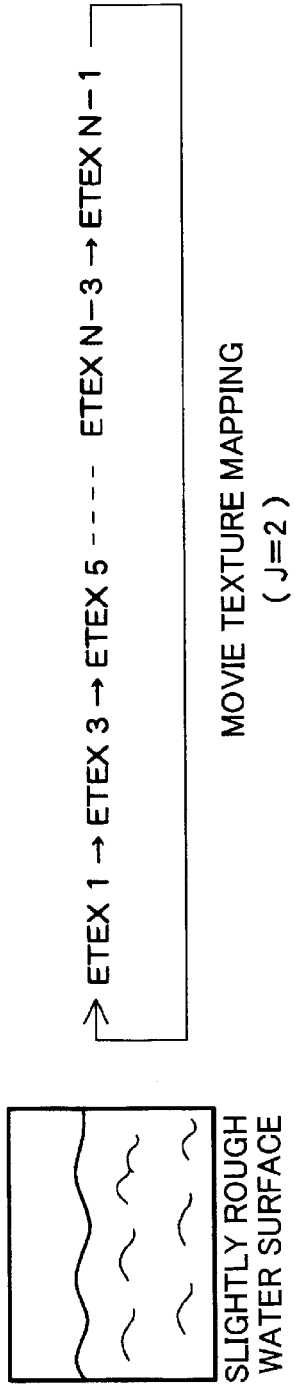

On the other hand, as shown in FIG. 10B, if the event is shifted to a game stage 2, the movie texture mapping for frame-decimation replay (when J=2) may be carried out in which textures as indicated by ETEX-1, ETEX-3, EXT.-5, . . . ETEX-(N–3), ETEX-(N–1), ETEX-1, ETEX-3 and so on are mapped on the object. This can represent a slightly rough water surface (or a water surface on which the water flows slightly violently).

Figure 10C:
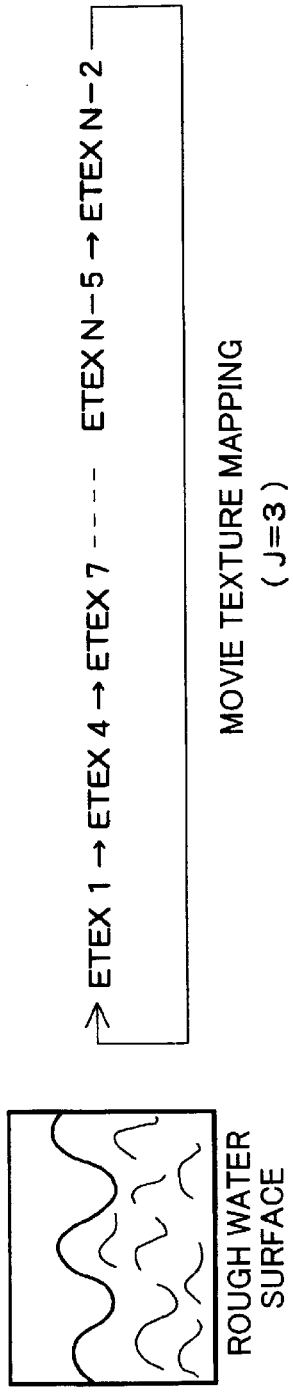

If the event is shifted to a game stage 3 as shown in FIG. 10C, the movie texture mapping for frame-decimation replay (when J=3) may be carried out in which textures as indicated by ETEX-1, ETEX-4, ETEX-7, . . . ETEX-(N–5), ETEX-(N–2), ETEX-1, ETEX-4 and so on are mapped on the object. This can represent a rough water surface (or a water surface on which the water flows violently).

Alternatively, if number J is varied incrementally such that J=1, 2, 3 . . . with time elapse, for example, a change from a calm water surface to a rough water surface with time elapse can be represented realistically.

The events at which the setting of J is changed may include various events such as a game stage change event, a game scene change event, a burning event, a bursting event, a hit event, a shooting event, an impact event, a disappearing event, a light illuminating event, an enemy boss entry event, an object generating event, an object deforming event, an item getting event, a game parameter updating event, a game score updating event, a virtual camera changing event and so on.

The elapsed time may be measured by counting up the count value (or count variable) at a frame update timing (or a timing at which the vertical sync signal VSYNC outputted toward the display unit becomes active). It may also be measured by the use of a real-time clock timer included in the image generation system.

2.3 Data Configuration

Figure 11:
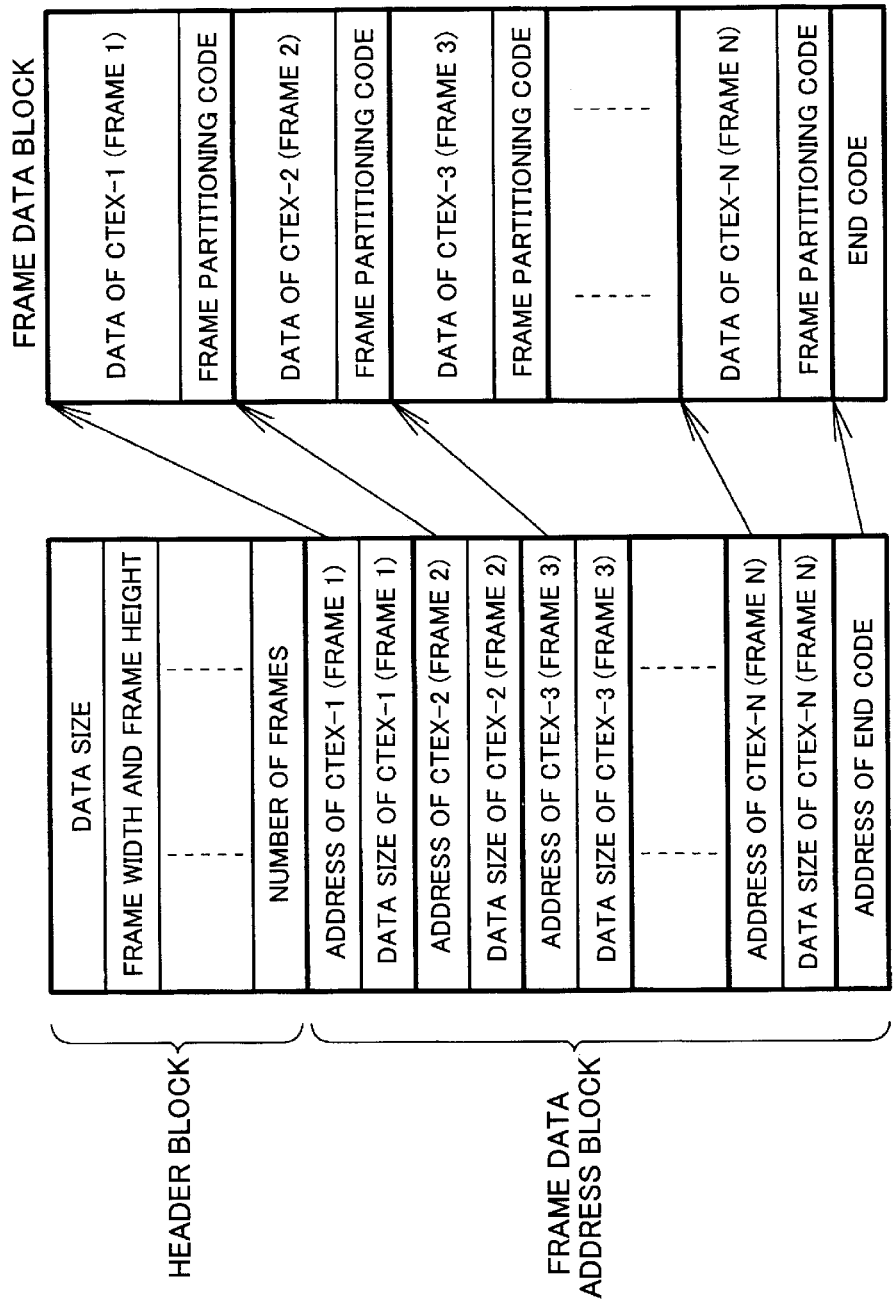
FIG. 11 shows an example of structure of the compressed movie texture data.

To implement the movie texture mapping for the random replay and the movie texture mapping for frame-decimation replay, this embodiment uses a compressed movie texture data having such a data configuration as shown in FIG. 11.

The compressed movie texture data has a header block (control data of compressed movie texture data), a frame data address block (data used to designate the storage locations of the compressed textures) and a frame data block (compressed texture data. Data of I picture of MPEG).

The header block includes data representing compressed movie texture data size, frame width (or the number of texels of one texture in width direction), frame height (or the number of texels of one texture in height direction) and the number of movie texture frames.

The frame data address block includes addresses of the compressed texture CTEX-1 to CTEX-N (or frames 1 to N) in the frame data block (i.e., head addresses for designating the storage locations), data sizes of the CTEX-1 to CTEX-N and encoding addresses in the frame data block.

The frame data block includes data of CTEX-1 to CTEX-N (or frames 1 to N) (image data), frame partitioning codes and end codes in the frame data block.

In this embodiment, the compressed movie texture data having such a data configuration as shown in FIG. 11 is created from the data of the compressed textures CTEX-1 to CTEX-N (or frames 1 to N). The created compressed movie texture data is then used to implement the aforementioned movie texture mapping for the random replay or the movie texture mapping for frame-decimation replay.

If the movie texture mapping for the random replay is to be performed, for example, the address (or storage location) of a compressed texture to be replayed is get from the frame data address block. A compressed texture at that address is then expanded by the expansion section with the expanded texture being mapped on an object. At this time, the mapping of the expanded texture is carried out by designating different frames between the adjacent objects.

If the movie texture mapping for the frame-decimation replay is to be performed, the address of a compressed texture to be replayed is get from the frame data address block while incrementing the frame number I by J ($\geq 2$). A compressed texture at that address is expanded by the expansion section with the expanded texture thereof being then mapped on the object.

When the compressed movie texture data having the data configuration of FIG. 11 is used as described, the compressed movie texture data, which could not be handled as a series of data can be managed by frame. Therefore, the compressed texture (or frame image) at an arbitrary frame can be expanded and used. This enables the random replay or the frame-decimation replay of the compressed texture in a simplified manner.

The compressed movie texture data having the data configuration of FIG. 11 may be previously prepared in the development of game program and recorded in an information storage medium or may be prepared in real time on start of the game or game stage.

3. Process of this Embodiment

The details of the process according to this embodiment will be described in connection with flowcharts of FIGS. 12 to 15.

Figure 12:
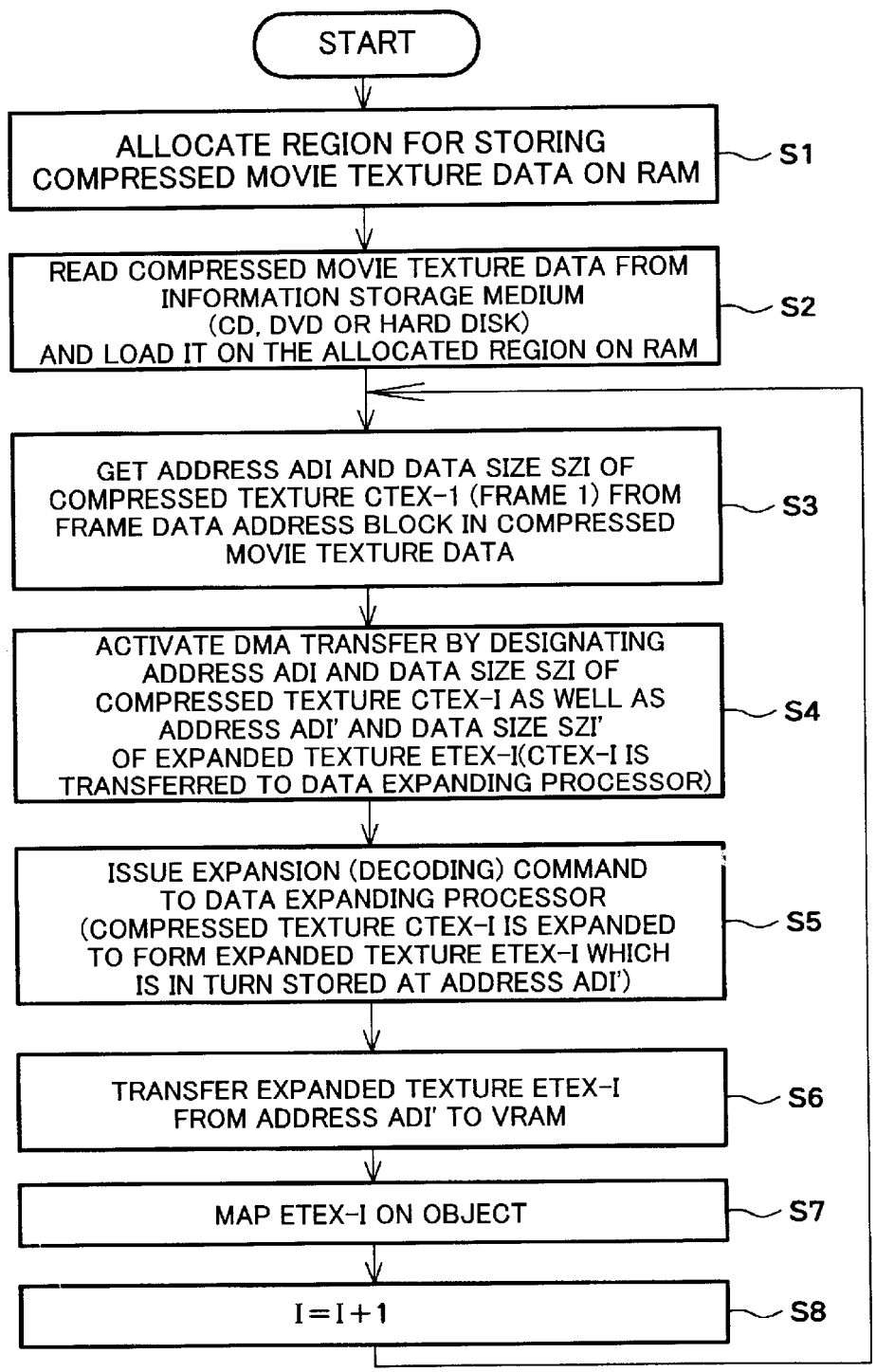
FIG. 12 is a flowchart showing details of the processing according to one embodiment of the present invention.

FIG. 12 is a flowchart illustrating the basic process of this embodiment.

Figure 16:
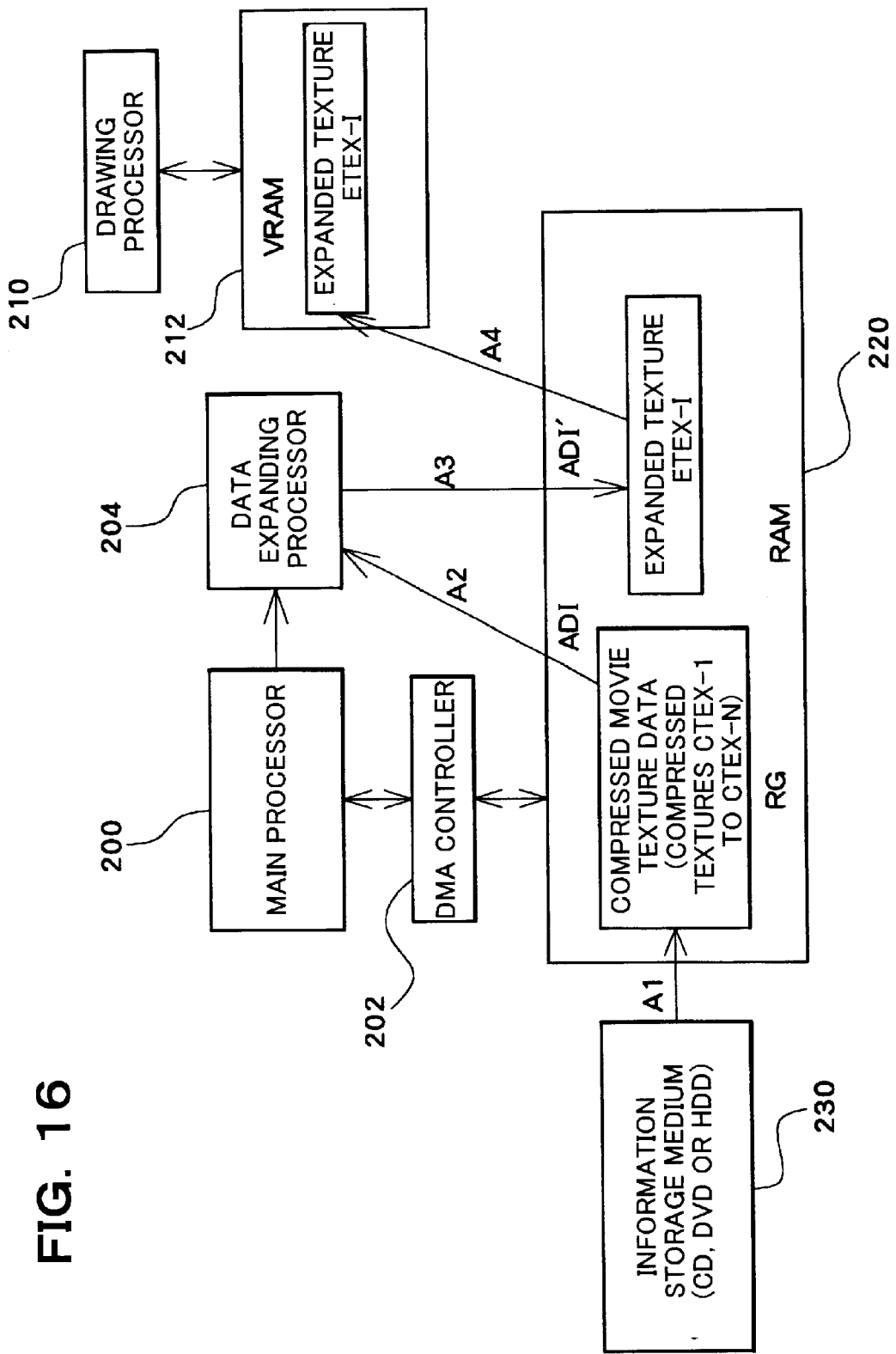
FIG. 16 illustrates details of the processing according to one embodiment of the present invention.

First of all, a region in which the compressed movie texture data (see FIG. 11) is stored is allocated in RAM 220 of FIG. 16 (step S1). As shown by A1 in FIG. 16, a compressed movie texture data is read in from an information storage medium (CD, DVD or HDD) 230 and then loaded in the allocated region RG on the RAM 220 (step S2).

Next, the address ADI and data size SZI of a compressed texture CTEX-I (frame I) are get from the frame data address block (see FIG. 11) within the compressed movie texture data loaded in the region RG (step S3).

Next, a main processor 220 activates DMA transfer through a DMA controller 202 by designating the address ADI and data size SZI of the compressed texture CTEX-I and at the same time designating the address ADI' at which an expanded texture ETEX-I is to be stored and the data size SZI' of the expanded texture ETEX-I (step S4). As shown by A2 in FIG. 16, thus, the compressed texture CTEX-I stored at the address ADI is transferred to a data expansion processor 204 (or expansion section).

Next, the main processor 200 issues an expansion (or decoding) command to the data expansion processor 204 (step S5). As shown by A3 in FIG. 16, thus, the compressed texture CTEX-I is expanded to form the expanded texture ETEX-I which is in turn stored at the address ADI' designated at the step S4.

Next, as shown by A4 in FIG. 16, the expanded texture ETEX-I is transferred from the address ADI' to VRAM 212 (step S6). A drawing processor 210 maps the transferred expanded texture ETEX-I on an object (step S7). Finally, the frame number I is incremented by one (step S8). The process returns to the step S3.

Figure 13:
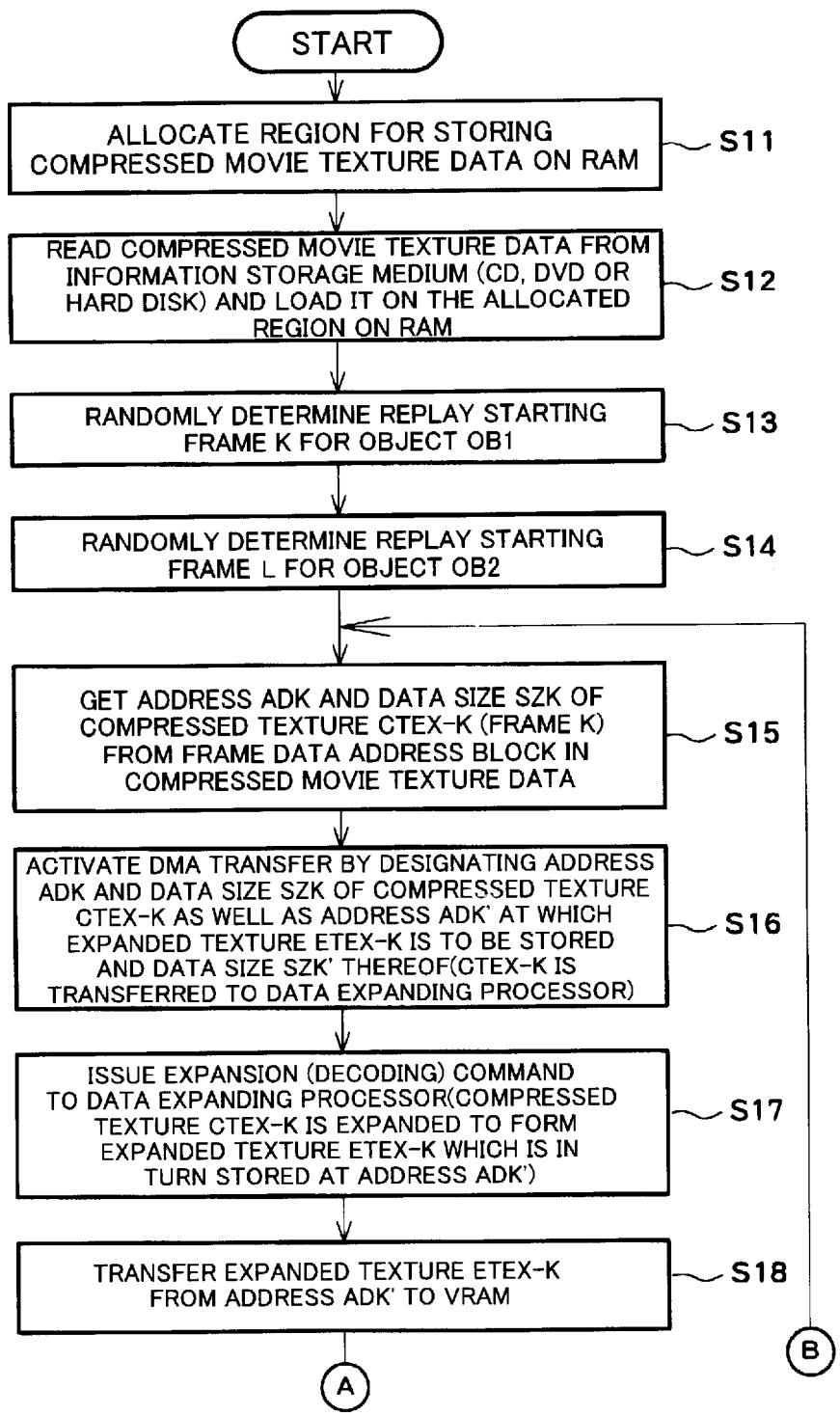
FIG. 13 is a flowchart showing details of the processing according to one embodiment of the present invention.

FIG. 13 is a flowchart illustrating the movie texture mapping for the random replay of FIG. 3.

First of all, a region in which the compressed movie texture data (see FIG. 11) is stored is allocated in RAM 220 of FIG. 16 (step S11). As shown by B1 in FIG. 17, a compressed movie texture data is read in from an information storage medium 230 and then loaded in the allocated region RG on the RAM 220 (step S12).

Next, a replay (expansion) starting frame K for the object OB1 is randomly determined while at the same time are play starting frame L for the object OB2 is randomly determined (steps S13 and S14).

Next, the address ADK and data size SZK of a compressed texture CTEX-K (frame K) are get from the frame data address block within the compressed movie texture data loaded in the region RG (step S15).

Next, the main processor 200 activates DMA transfer through the DMA controller 202 by designating the address ADK and data size SZK of the compressed texture CTEX-K and at the same time designating the address ADK' and data size SZK' of an expanded texture ETEX-K (step S16). As shown by B2 in FIG. 17, thus, the compressed texture CTEX-K stored at the address ADK is transferred to the data expansion processor 204.

Next, the main processor 200 issues an expansion command to the data expansion processor 204 (step S17). As shown by B3 in FIG. 17, thus, the compressed texture CTEX-K is expanded to form the expanded texture ETEX-K which is in turn stored at the address ADK'.

Figure 17:
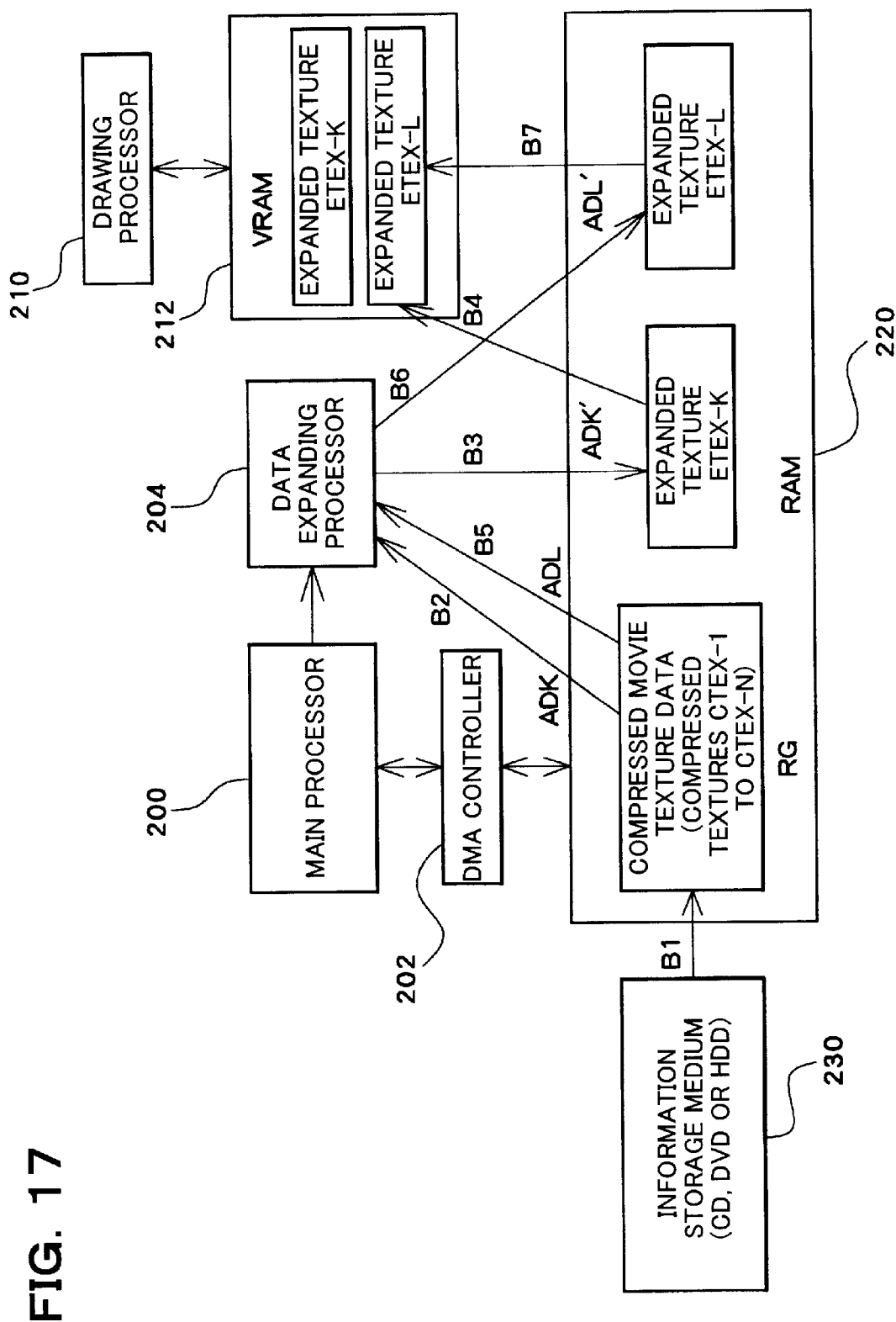
FIG. 17 illustrates details of the processing according to one embodiment of the present invention.

Next, as shown by B4 in FIG. 17, the expanded texture ETEX-K is transferred from the address ADK' to VRAM 212 (step S18).

Figure 14:
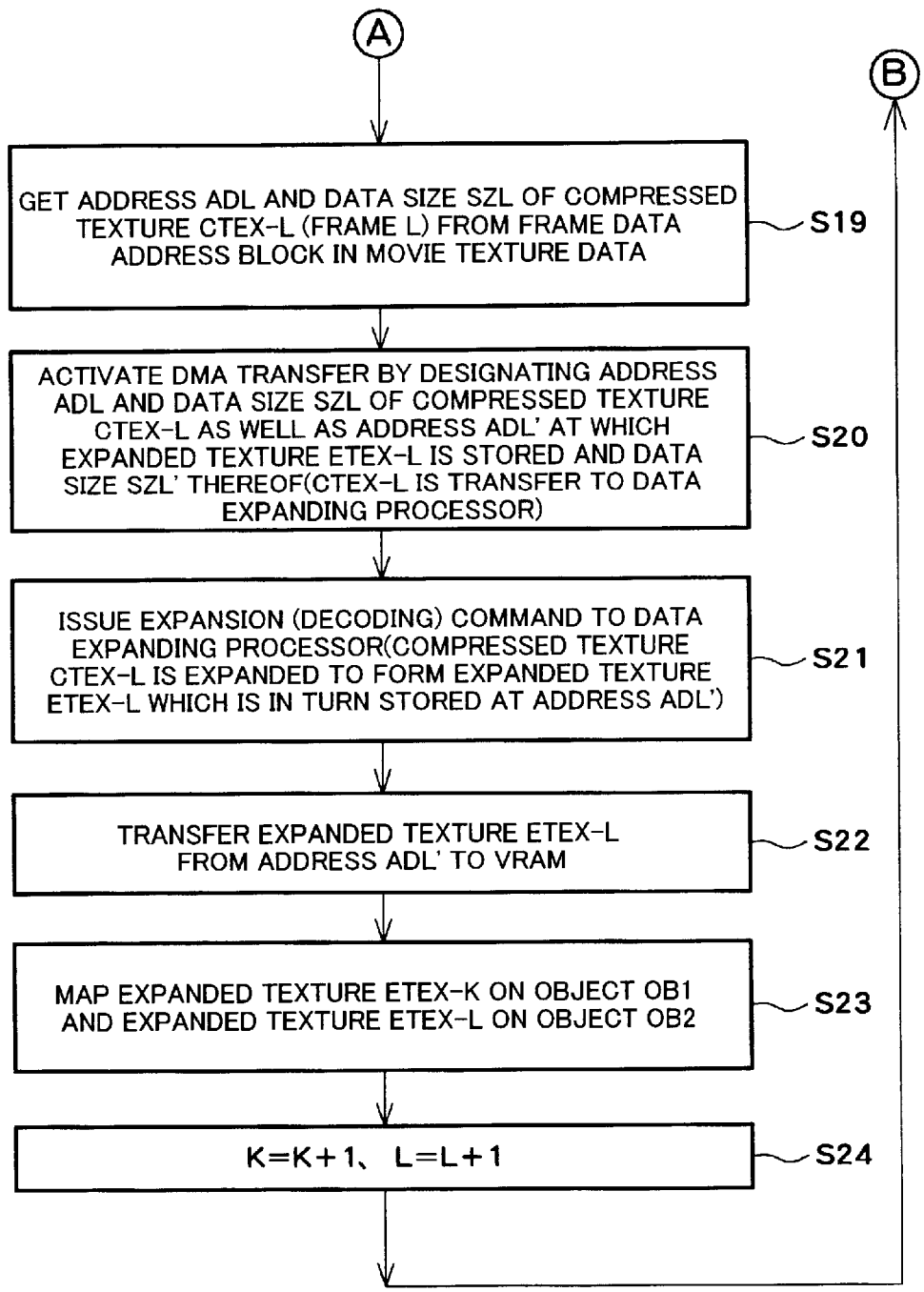
FIG. 14 is a flowchart showing details of the processing according to one embodiment of the present invention.

Next, the address ADL and data size SZL of a compressed texture CTEX-L (frame L) are get from the frame data address block within the compressed movie texture data loaded in the region RG (step S19 in FIG. 14).

Next, the main processor 200 activates DMA transfer through the DMA controller 202 by designating the address ADL and data size SZL of the compressed texture CTEX-L and at the same time designating the address ADL' at which an expanded texture ETEX-L is to be stored and the data size SZL' of the expanded texture ETEX-L (step S20). As shown by B5 in FIG. 17, thus, the compressed texture CTEX-L stored at the address ADL is transferred to the data expansion processor 204.

Next, the main processor 200 issues an expansion command to the data expansion processor 204 (step S21). As shown by B6 in FIG. 17, thus, the compressed texture CTEX-L is expanded to form the expanded texture ETEX-L which is in turn stored at the address ADL'.

Next, as shown by B7 in FIG. 17, the expanded texture ETEX-L is transferred from the address ADL' to VRAM 212 (step S22).

Next, the drawing processor 210 maps the expanded texture ETEX-K transferred at the step S18 on the object OB1 and the expanded texture ETEX-L transferred at the step S22 on the object OB2 (step S23). Finally, the frame numbers K and L are incremented by one (step S24) and the process returns to the step S15 of FIG. 13.

Figure 7:
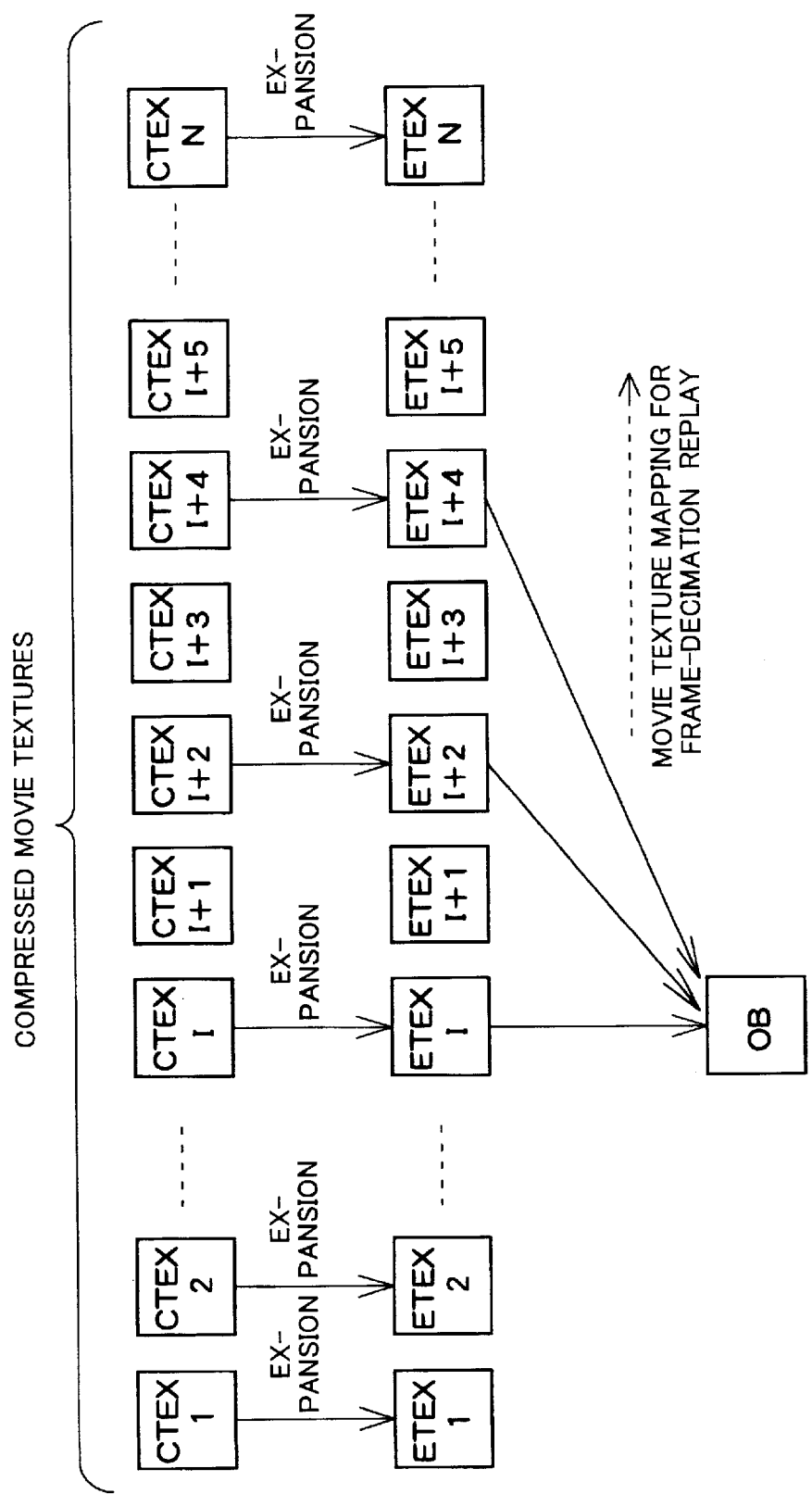
FIG. 7 illustrates a movie texture mapping for the frame-decimation replay.
Figure 15:
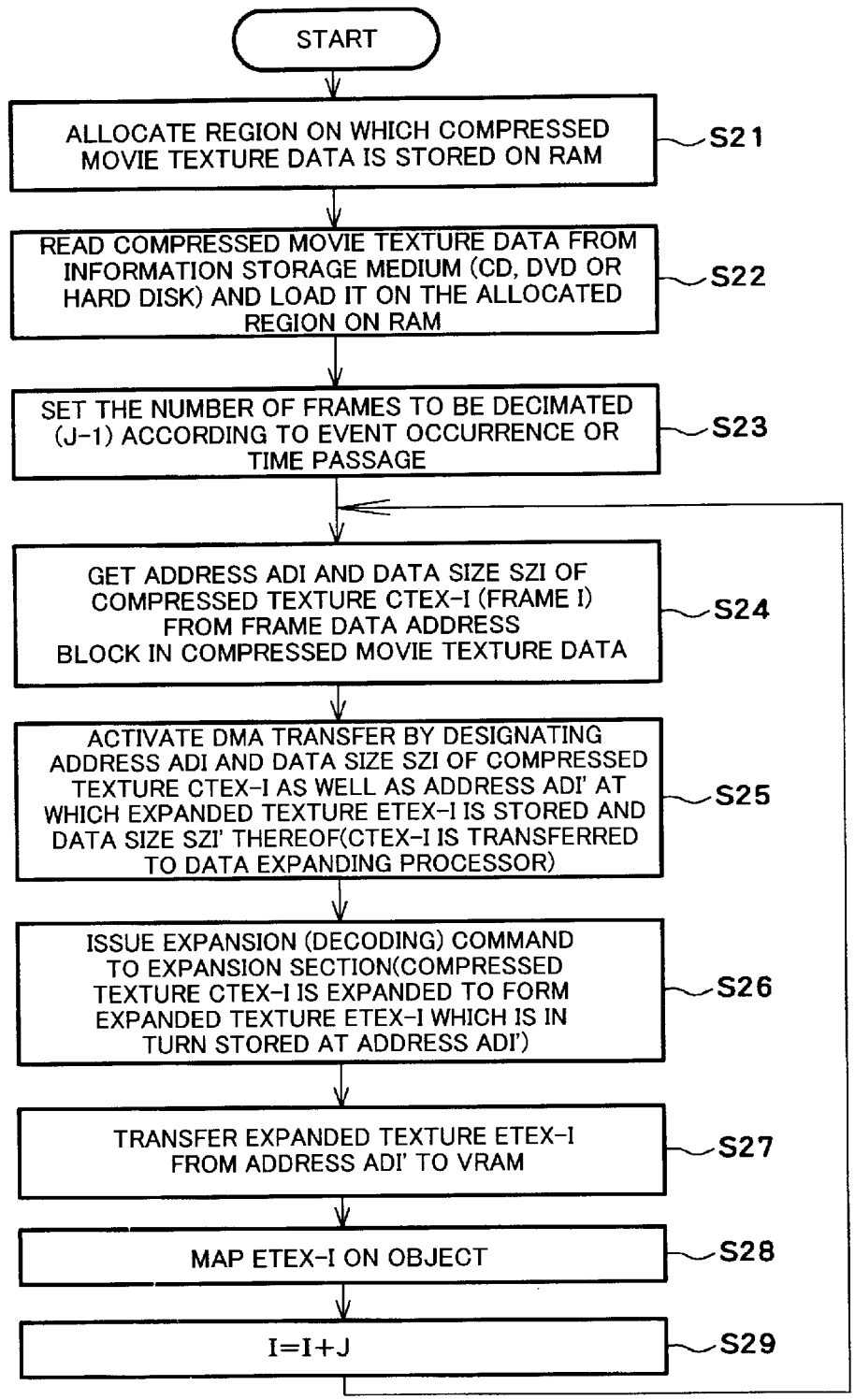
FIG. 15 is a flowchart showing details of the processing according to one embodiment of the present invention.

FIG. 15 is a flowchart illustrating the movie texture mapping for the frame-decimation replay of FIG. 7.

Steps S21, S22 and S24 to S28 in FIG. 15 are substantially identical with the steps S1 to S7 in FIG. 12. FIG.15 is different from FIG. 12 only in that FIG. 15 sets the number of texture frames (J−1) to be decimated according to the event occurrence or time passage at the step S23 and the number I is incremented by J ($\geq 2$) at the step S29. In such a manner, the movie texture mapping in which (J−1) frames are decimated can be implemented.

4. Hardware Configuration

Figure 18:
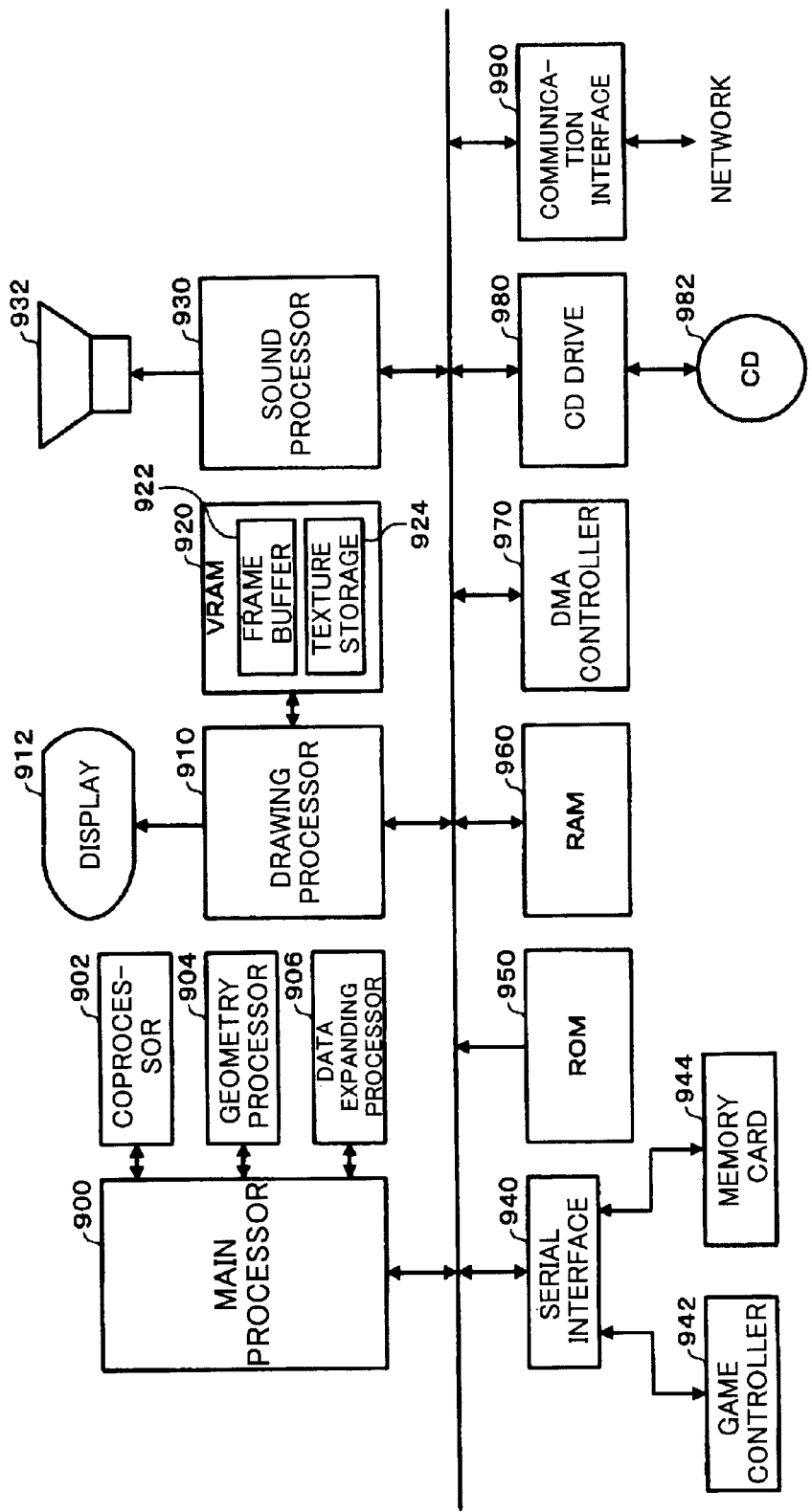
FIG. 18 shows a hardware configuration for implementing one embodiment of the present invention.

A hardware arrangement which can implement this embodiment is shown in FIG. 18.

A main processor 900 operates to execute various processings such as game processing, image processing, sound processing and other processings according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expansion processor 906 is to perform a decoding process for expanding image and sound compressed data or a process for accelerating the decoding process in the main processor 900. In the opening, intermission, ending or game scene, thus, an MPEG compressed moving image may be displayed. The image and sound data to be decoded may be stored in the storage devices including ROM 950 and CD 982 or may externally be transferred through the communication interface 990.

A drawing processor 910 is to draw or render an object constructed by primitives (or primitive faces) such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942 (lever, button, housing, pad-type controller or gun-type controller), saved data from a memory card 944 and personal data may externally be transferred through a serial interface 940.

ROM 950 has stored a system program and soon. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMS, VRAMs, ROMs or the like).

CD drive 980 drives a CD (information storage medium) 982 in which the programs, image data or sound data have been stored and enables these programs and data to be accessed.

The communication interface 990 is to perform data transfer between the image generation system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the present image generation system and any other image generation system.

All the means of this embodiment of the present invention maybe implemented (or executed) by hardware only, or by a program stored in an information storage medium or distributed through a communication interface. Alternatively, they may be implemented by hardware and a program.

If all the means of this embodiment of the present invention are implemented by hardware and a program, a program for implementing the means through hardware is stored in an information storage medium. More particularly, this program gives instructions to hardware processors such as processors 902, 904, 906, 910 and 930 and delivers the data to them, if necessary. The processors implement the means of the embodiment of the present invention based on the instructions and data.

Figure 19A:
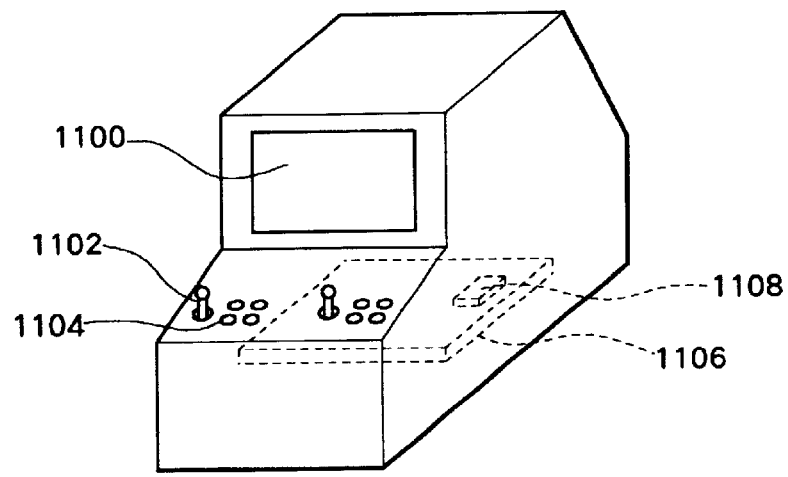
FIGS. 19A, 19B and 19C show various systems to which the embodiments of the present invention can be applied.

FIG. 19A shows an arcade game system (or image generation system) to which this embodiment is applied. Players enjoy a game by controlling a controller 1102 while viewing a game scene displayed on a display 1100. A system board (circuit board) 1106 included in the game system includes various processor and memories which are mounted thereon. A program (or data) for implementing the means of the embodiment of the present invention is stored in a memory 1108 or an information storage medium on the system board 1106. Such a program will be referred to the stored program (or stored information).

Figure 19B:
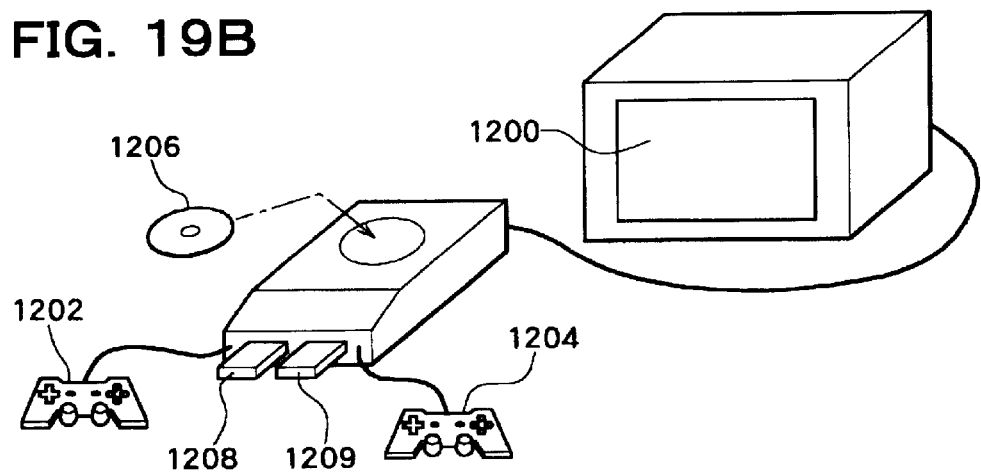

FIG. 19B shows a home game system (or image generation system) to which this embodiment is applied. A player enjoys a game by manipulating controllers 1202 and 1204 while viewing a game picture displayed on a display 1200. In such a case, the aforementioned stored program (or information) has been stored in CD 1206 or memory cards 1208, 1209 which are detachable information storage media in the game system body.

Figure 19C:
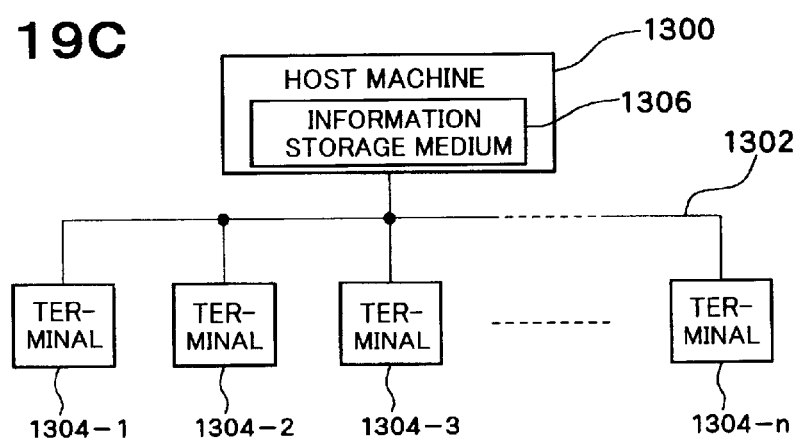

FIG. 19C shows an example wherein this embodiment is applied to a game system which includes a host machine 1300 and terminals 1304-1 to 1304-n (or game machines or portable telephones) connected to the host machine 1300 through a network (which is a small-scale network such as LAN or a global network such as the Internet) 1302. In such a case, the above stored program (or information) has been stored in an information storage medium 1306 such as magnetic disk device, magnetic tape device, memory or the like which can be controlled by the host machine 1300, for example. If the terminals 1304-1 to 1304-n generate game images and game sounds in a stand-alone manner, the host machine 1300 delivers the game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the configuration of FIG. 19C, the means of the embodiment of the present invention may be divided to be implemented by the host machine (or server) and terminals. The above-described stored information for implementing the means of the embodiment may also be divided to be stored in the information storage media of the host machine (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but maybe carried out in any of various other forms.

For example, the invention in which the compressed movie data contains the data for designating the storage locations of the first to N-th compressed frame images (frame data address block) (see FIG. 11) is particularly effective for the movie texture mapping for the random replay (expansion) and the movie texture mapping for the frame-decimation replay shown in FIGS. 3 and 7, but may be applied to any other image generating technique.

The data configuration of the compressed movie texture (compressed movie) is not limited to that of FIG. 11, but may take any other form if it contains at least the data of compressed movie texture (compressed movie) and the data of designating the storage locations of the first to N-th compressed textures (or first to N-th compressed frame images).

The structures of the expansion and storage sections are not limited to those of FIGS. 16 and 17.

Part of the invention as defined in any of the dependent claims may be changed to omit part of the elements of claims on which that dependent claims depend. The main part of any independent claim can be made to depend on any other independent claim.

The present invention may be applied to any of various games such as fighting games, shooting games, robot combat games, sports games, competitive games, role-playing games, music playing games, dancing games and so on.

Furthermore, the present invention can be applied to various game systems (image generation systems) such as arcade game systems, home game systems, large-scaled multi-player attraction systems, simulators, multimedia terminals, image generation systems, game image generation system boards and so on.

What is claimed is:

1. An image generation system comprising:
an expansion section which expands a series of first to N-th compressed textures included in compressed movie textures, wherein at least one compressed movie texture includes designation data which randomly sets a K-th expanded texture and a L-th expanded texture; and
a texture mapping section which maps a series of first to N-th expanded textures sequentially onto an object, the series of first to N-th expanded textures being obtained by expanding the series of first to N-th compressed textures,
wherein the texture mapping section, in accordance with the designation data, maps the series of first to N-th expanded textures onto a first object in the order starting from the K-th expanded texture obtained by expanding the K-th compressed texture, and also onto a second object in the order starting from the L-th expanded texture obtained by expanding the L-th compressed texture.

2. An image generation system comprising:

a storage section which stores compressed movie texture data including a series of first to N-th compressed textures;

an expansion section which expands the series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein:

the compressed movie texture data stored in the storage section contains designation data used to designate storage locations of the first to N-th compressed textures, the texture mapping section maps an expanded texture obtained by expanding a compressed texture designated by the designation data onto an object, the texture mapping section maps the series of first to N-th expanded textures onto a first object in the order starting from a K-th expanded texture obtained by expanding the K-th compressed texture, and also onto a second object in the order starting from a L-th expanded texture obtained by expanding the L-th compressed texture, and the compressed movie texture data includes designation data which randomly sets the K-th expanded texture and the L-th expanded texture.

3. An image generation system comprising:

a storage section which stores compressed movie texture data including a series of first to N-th compressed textures;

an expansion section which expands the series of first to N-th compressed textures included in compressed movie textures; and a texture mapping section which maps a series of first to N-th expanded textures seciuentially onto an object, the series of first to N-th expanded textures being obtained by expanding the series of first to N-th compressed textures, wherein:

the compressed movie texture data stored in the storage section contains designation data used to designate storage locations of the first to N-th compressed textures, the texture mapping section maps an expanded texture obtained by expanding a compressed texture designated by the designation data onto an object, the texture mapping section maps the series of first to N-th expanded textures sequentially onto an object while performing texture frame decimation in which mapping of the I-th expanded texture is followed by mapping of the (I+J)-th expanded texture (when J≧2), and a value of the number J is determined according to at least one of an occurrence of a given event and an elapse of given time.

4. The image generation system as defined in claim 1, wherein the first and second objects are arranged to overlap each other.

5. The image generation system as defined in claim 4 wherein the first and second objects are arranged such that a non-transparent part of a texture to be mapped on the first object overlaps a non-transparent part of another texture to be mapped on the second object, in all frames to be replayed.

6. A computer-usable program making a computer function as:

an expansion section which expands a series of first to N-th compressed textures included in compressed movie textures, wherein at least one compressed movie texture includes designation data which randomly sets a K-th expanded texture and a L-th expanded texture; and a texture mapping section which maps a series of first to N-th expanded textures sequentially onto an object, the series of first to N-th expanded textures being obtained by expanding the series of first to N-th compressed textures, wherein the texture mapping section maps, in accordance with the designation data, the series of first to N-th expanded textures onto a first object in the order starting from the K-th expanded texture obtained by expanding the K-th compressed texture, and also onto a second object in the order starting from the L-th expanded texture obtained by expanding the L-th compressed texture.

7. A computer-usable program making a computer function as:

a storage section which stores compressed movie texture data including a series of first to N-th compressed textures:

an expansion section which expands the series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein:

the compressed movie texture data stored in the storage section contains designation data used to designate storage locations of the first to N-th compressed textures, the texture mapping section maps an expanded texture obtained by expanding a compressed texture designated by the designation data onto an object, the texture mapping section maps the series of first to N-th expanded textures onto a first object in the order starting from a K-th expanded texture obtained by expanding the K-th compressed texture, and also onto a second object in the order starting from a L-th expanded texture obtained by expanding the L-th compressed texture, and the compressed movie texture data includes designation data which randomly sets the K-th expanded texture and the L-th expanded texture.

8. A computer-usable program making a computer function as:

a storage section which stores compressed movie texture data including a series of first to N-th compressed textures;

an expansion section which expands the series of first to N-th compressed textures included in compressed movie textures; and a texture mapping section which maps a series of first to N-th expanded textures sequentially onto an object, the series of first to N-th expanded textures being obtained by expanding the series of first to N-th compressed textures, wherein:

the compressed movie texture data stored in the storage section contains designation data used to designate storage locations of the first to N-th compressed textures, the texture mapping section maps an expanded texture obtained by expanding a compressed texture designated by the designation data onto an object, and the texture mapping section maps the series of first to N-th expanded textures sequentially onto an object while performing texture frame decimation in which mapping of the I-th expanded texture is followed by mapping of the (I+J)-th expanded texture (when J≧2), wherein a value of the number J is determined according to at least one of an occurrence of a given event and an elapse of given time.

9. The computer-usable program as defined in claim 6, wherein the first and second objects are arranged to overlap each other.

10. The computer-usable program as defined in claim 9, wherein the first and second objects are arranged such that a non-transparent part of a texture to be mapped on the first object overlaps a non-transparent part of another texture to be mapped on the second object, in all frames to be replayed.

11. A method of generating an image comprising the steps of:

expanding a series of first to N-th compressed textures included in compressed movie textures, wherein at least one compressed movie texture includes designation data which randomly sets a K-th expanded texture and a L-th expanded texture; and mapping a series of first to N-th expanded textures sequentially onto an object, the series of first to N-th expanded textures being obtained by expanding the series of first to N-th compressed textures, wherein the series of first to N-th expanded textures are mapped, in accordance with the designation data, onto a first object in the order starting from the K-th expanded texture obtained by expanding the K-th compressed texture, and also onto a second object in the order starting from the L-th expanded texture obtained by expanding the L-th compressed texture.

12. A method of generating an image comprising the steps of:

storing compressed movie texture data including a series of first to N-th compressed textures in a storage section;

expanding the series of first to N-th compressed textures included in compressed movie textures; and mapping a series of first to N-th expanded textures sequentially onto an object, the series of first to N-th expanded textures being obtained by expanding the series of first to N-th compressed textures, wherein:

designation data used to designate storage locations of the first to N-th compressed textures is included in the compressed movie texture data stored in the storage section, an expanded texture obtained by expanding a compressed texture designated by the designation data is mapped onto an object, the series of first to N-th expanded textures are mapped onto a first object in the order starting from a K-th expanded texture obtained by expanding the K-th compressed texture, and also onto a second object in the order starting form a L-th expanded texture obtained by expanding the L-th compressed texture, and the compressed movie texture data includes designation data which randomly sets the K-th expanded texture and the L-th expanded texture.

13. A method of generating an image comprising the steps of:

storing compressed movie texture data including a series of first to N-th compressed textures in a storage section;

expanding the series of first to N-th compressed textures included in compressed movie textures; and mapping a series of first to N-th expanded textures sequentially onto an object, the series of first to N-th expanded textures being obtained by expanding the series of first to N-th compressed textures, wherein:

designation data used to designate storage locations of the first to N-th compressed textures is included in the compressed movie texture data stored in the storage section, an expanded texture obtained by expanding a compressed texture designated by the designation data is mapped onto an object, the series of first to N-th expanded textures are sequentially mapped onto an object while performing texture frame decimation in which mapping of the I-th expanded texture is followed by mapping of the (I+J)-th expanded texture (when J≧2), and a value of the number J is determined according to at least one of an occurrence of a given event and an elapse of given time.

14. The method of generating an image as defined in claim 11, wherein the first and second objects are arranged to overlap each other.

15. The method of generating an image as defined in claim 14, wherein the first and second objects are arranged such that a non-transparent part of a texture to be mapped on the first object overlaps a non-transparent part of another texture to be mapped on the second object, in all frames to be replayed.

16. An image generation system comprising:

a storage section which stores compressed movie data including a series of first to N-th compressed frame images;

an expansion section which expands the series of first to N-th compressed frame images included in compressed movies, wherein:

the compressed movie data stored in the storage section contains designation data used to designate storage locations of the first to N-th compressed frame images; and a frame image, obtained by expanding a compressed frame image designated by the designation data, is replayed; and a mapping section which maps a series of first to N-th frame images sequentially onto an object, the series of first to N-th frame images being obtained by expanding the series of first to N-th compressed frame images, wherein:

the mapping section, in accordance with the designation data, maps the series of first to N-th frame images onto a first object in the order starting from a K-th frame image obtained by expanding the K-th compressed frame image, and also onto a second object in the order starting from a L-th frame image obtained by expanding the L-th frame image; and at least one of the compressed frame images includes designation data which randomly sets the K-th frame image and the L-th frame image.

17. An computer-usable program making a computer function as:

a storage section which stores compressed movie data including a series of first to N-th compressed frame images;

an expansion section which expands the series of first to N-th compressed frame images included in compressed movies, wherein:

the compressed movie data stored in the storage section contains designation data used to designate storage locations of the first to N-th compressed frame images;

a frame image, obtained by expanding a compressed frame image designated by the designation data, is replayed; and a mapping section which maps a series of first to N-th frame images sequentially onto an object, the series of first to N-th frame images being obtained by expanding the series of first to N-th compressed frame images, wherein:

the mapping section, in accordance with the designation data, maps the series of first to N-th frame images onto a first object in the order starting from a K-th frame image obtained by expanding the K-th compressed frame image, and also onto a second object in the order starting from a L-th frame image obtained by expanding the L-th frame image; and at least one of the compressed frame images includes designation data which randomly sets the K-th frame image and the L-th frame image.

18. A method comprising the steps of:

storing compressed movie data including a series of first to N-th compressed frame images in a storage section;

expanding the series of first to N-th compressed frame images included in compressed movies, wherein:

designation data used to designate storage locations of the first to N-th compressed frame images is included in the compressed movie data stored in the storage section, and a frame image, obtained by expanding a compressed frame image designated by the designation data, is replayed; and mapping a series of first to N-th frame images sequentially onto an object, the series of first to N-th frame images being obtained by expanding the series of first to N-th compressed frame images, wherein:

a mapping section, in accordance with the designation data, maps the series of first to N-th expanded textures onto a first object in the order starting from a K-th expanded texture obtained by expanding the K-th frame image, and also onto a second object in the order starting from a L-th frame image obtained by expanding the L-th frame image; and at least one of the compressed frame images includes designation data which randomly sets the K-th frame image and the L-th frame image.

* * * * *